United States Patent
Abedin (12)

(10) Patent No.: US 6,943,871 B1
(45) Date of Patent: Sep. 13, 2005

(54) OPTICAL DISPERSION MEASUREMENT APPARATUS AND MEASUREMENT METHOD USING SAME

(75) Inventor: Kazi Sarwar Abedin, Cambridge, MA (US)

(73) Assignee: National Institute of Information and Communications Technology, Tokyo (JP)

( * ) Notice: Subject to any disclaimer, the term of this patent is extended or adjusted under 35 U.S.C. 154(b) by 687 days.

(21) Appl. No.: 09/704,610

(22) Filed: Nov. 3, 2000

(30) Foreign Application Priority Data

Nov. 5, 1999 (JP) .......................................... 11-315413
Sep. 1, 2000 (JP) ...................................... 2000-265529

(51) Int. Cl.[7] ............................................ G01N 21/00
(52) U.S. Cl. .................................................... 356/73.1
(58) Field of Search ..................... 356/73.1, 450–465; 385/11–14, 1, 24, 31

(56) References Cited

U.S. PATENT DOCUMENTS 5,056,919 A * 10/1991 Arditty et al. .............. 356/464
5,377,283 A * 12/1994 Blake et al. .................. 385/11
5,774,217 A    6/1998 Lee et al.

FOREIGN PATENT DOCUMENTS

EP    0 342 847    11/1989
EP    0 685 722    12/1995

OTHER PUBLICATIONS

V. Vali, et al., Applied Optics, vol. 16, No. 10, pp. 2605–2607, "Fresnel–Fizeau Effect In a Rotating Optical Fiber Ring Interferometer", Oct. 1977.

* cited by examiner

Primary Examiner—Tu T. Nguyen
(74) Attorney, Agent, or Firm—Oblon, Spivak, McClelland, Maier & Neustadt, P.C.

(57) ABSTRACT

An optical dispersion measurement apparatus includes a device for generating a light beam; wiring for inputting the light beam to a first terminal of an optical distributor; wiring for outputting the input light beam as a plurality of light beams; an optical modulation device for modulating at least two of the light beams; an optical path via which the at least two beams are returned to the optical distributor; wiring for outputting the light beams returned to the optical distributor from a second terminal of the optical distributor; a device for detecting the light output from the second terminal; and a device for relating an intensity of the detected light to an optical modulation frequency that is used.

44 Claims, 30 Drawing Sheets

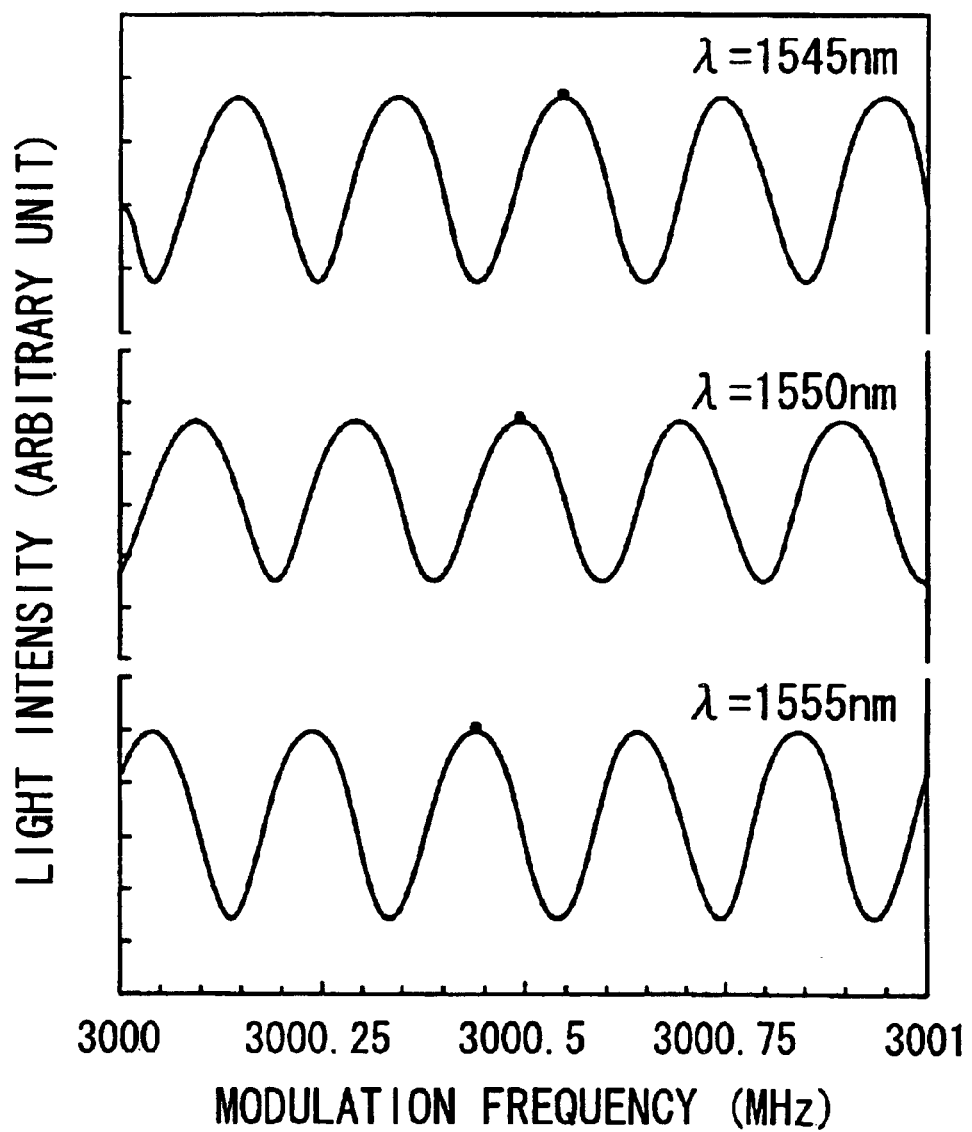

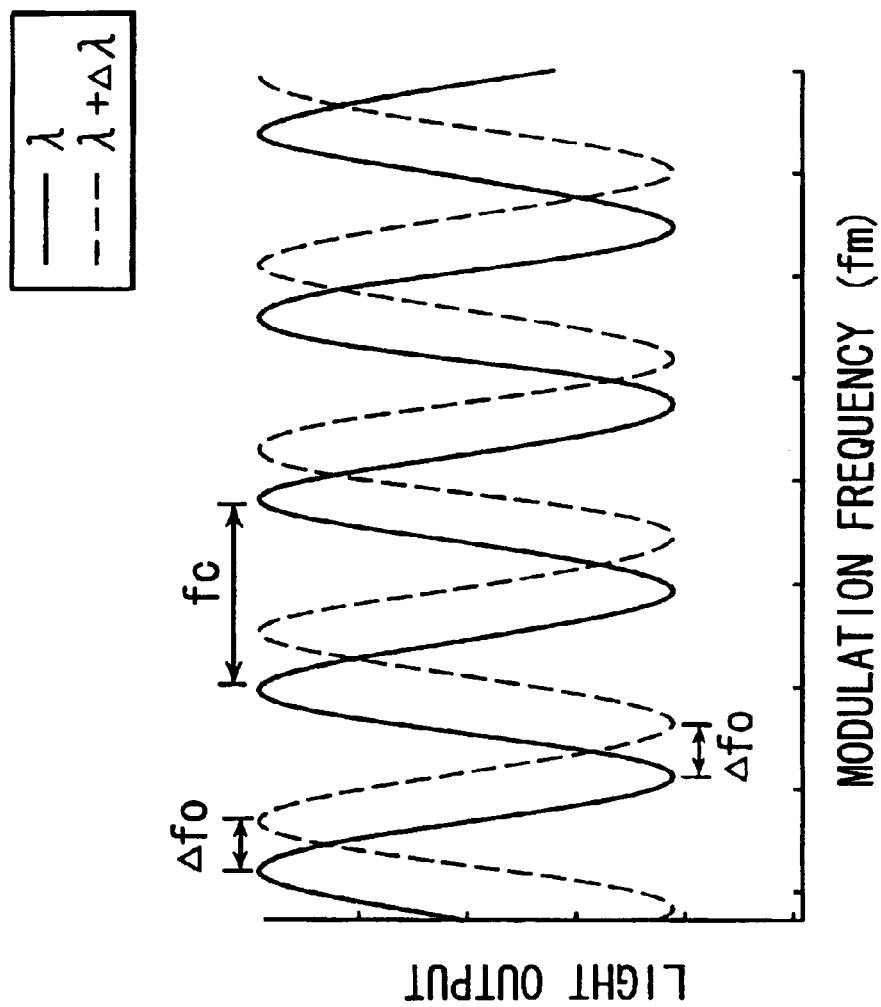

OPTICAL DISPERSION MEASUREMENT APPARATUS AND MEASUREMENT METHOD USING SAME

BACKGROUND OF THE INVENTION

1. Field of the Invention

The present invention relates to an optical dispersion measurement apparatus and to a measurement method using the apparatus. More particularly, this invention relates to an apparatus for measuring the optical group velocity dispersion in single-mode optical fibers, and to a measurement method that uses the apparatus to measure the group velocity dispersion, the length of an optical fiber, and the distance to a measurement object.

2. Description of the Prior Art

Optical signals of different wavelengths propagating in an optical fiber travel at different velocities. This is referred to as group velocity dispersion, and increases the width of the optical pulses traveling along the optical fiber. Currently most optical communication applications use wavelengths in the 1.3–1.55 $\mu$m regions. In order to transmit signals over long distances, it is necessary to utilize optical fiber having optimal group velocity dispersion characteristics. With respect to methods of generating short pulses using optical fibers that compensate pulse chirp and utilize nonlinear and dispersion effects, the fibers used have to have optimal group velocity dispersion and length. Measurement of the group velocity dispersion in single-mode fibers is an essential part of achieving this.

The main methods of measuring optical-fiber group velocity dispersion are: a) the pulse-delay method; b) the interferometric method; c) the phase-shift method; and d) the baseband AM response method. Each of these methods are discussed below.

The pulse-delay method is described, for example, in "Pulse delay measurements in the zero material dispersion wavelength region for optical fibers," by L. G. Cohen and Chinlon Lin (Applied Optics, Vol. 16, No. 12, pp. 3136–3139 (1977)). In this pulse-delay method, optical pulses having different center wavelengths are transmitted through the optical fiber being measured, and the relative pulse-delay time is measured to obtain the group velocity dispersion. The precision of this method is limited by the electrical bandwidth of the optical detector used to measure incident pulse width and relative delay time, and by the electrical bandwidth of the oscilloscope used for time-base measurements. It is therefore necessary to use detectors and oscilloscopes having high-frequency capabilities.

The interferometric method is described in "Interferometric method for chromatic dispersion measurement in a single-mode optical fiber," by M. Tateda, N. Shibata and S. Seikai (IEEE Journal of Quantum Electronics, Vol. 17, No. 3, pp. 404–407 (1981)). In this method, optical pulses are divided into two components. One of these is used as a reference, and the other is transmitted through the fiber, passed through an optical delay circuit and reunited with the reference beam. By varying the reference beam delay, an interference fringe is obtained that is used to calculate the group velocity dispersion. Although this method does not require the use of high-frequency detectors or oscilloscopes, it is difficult to measure dispersion in long fibers, and is limited to measurements of fibers of up to 10 meters in length.

The phase-shift method of measuring group velocity dispersion is described, for example, in "Direct measurement of wavelength dispersion in optical fiber-difference method," by K. Daikoku and A. Sugimura (Electronics Letters, Vol. 14, No. 5, pp. 149–151 (1978)). In this method, the beam from a single-mode laser is intensity-modulated and guided into the optical fiber to be measured. The incident light being subjected to the group velocity dispersion effect of the fiber, the phase of the baseband signal of the light exiting the fiber changes with the change in the optical wavelength. The method obtains the group velocity dispersion by using an oscilloscope to measure changes in the phase of the baseband signal against wavelength. The precision of measurements obtained by the method is limited by the modulation frequency, the bandwidths of the optical detector and the oscilloscope.

"Simple dispersion measurement technique with high resolution," by B. Christensen, J. Mark, G. Jacobsen and E. Bodtker (Electronics Letters, Vol. 29, No. 1, pp. 132–134 (1993)) describes the baseband AM response method of measuring group velocity dispersion. A feature of the method is that it measures the group velocity directly. A beam from a single-mode laser is subjected to high-frequency amplitude modulation and input to the optical fiber. In the fiber, owing to the dispersion effect, the phase of two sidebands generated by the amplitude modulation undergoes change. As a result, at a given modulation frequency, the modulation undergoes a transition from amplitude to frequency modulation. The group velocity dispersion can be found by measuring this frequency. To use this method, the optical fiber concerned must be long, in the order of several tens of kilometers, and a network analyzer with a frequency capability of over ten gigahertz.

There is an optical gyro based on the Sagnac effect that is similar to the configuration of the present invention. Such a configuration is described in U.S. Pat. No. 5,056,919, for example. However, the objective of the apparatus configuration differs from that of the present invention. What the present invention has in common with the invention of the above disclosure is that both include means for inputting a light beam from a light-generating means to a first terminal of an optical distributor, means of outputting the input light from third and fourth terminals of the optical distributor, a substantially single optical path that links the third and fourth terminals, means of modulating light traveling from the third terminal to the fourth terminal and light traveling from the fourth terminal to the third terminal, means of outputting from a second terminal of the optical distributor light traveling from the third terminal to the fourth terminal and light traveling from the fourth terminal to the third terminal, and means of detecting intensity of light output from the second terminal.

However, another feature of that invention is to use a monochromatic optical source, whereas a feature of the present invention is to use a variable-wavelength optical source. The present invention also differs in that it includes a means to scan the light modulation frequency and a means to correlate the optical intensity of the light output from the second terminal as a periodic function of the modulation frequency. The present invention's inclusion of means for varying the modulation frequency makes it possible to also measure the effect of the dispersion of fibers comprising the interferometer by thus varying the frequency. Moreover, in contrast to an optical gyro having a non-replaceable measurement object and which is utilized for measuring rotation and the like, in the present invention the measurement object can be replaced and forms part of the interferometer. This is a major difference with respect to measurement of optical characteristics. Furthermore, while in the case of an optical gyro modulation is performed at a fixed eigen frequency (with f being a characteristic eigen frequency, $f=c/(2nL)$, where n denotes refractive index, L denotes loop length and c denotes velocity of light in a vacuum), the measurement method of the present invention uses scanning at a frequency in the radio frequency range that is much higher than an eigen frequency to measure the optical characteristics of the object fiber.

In the prior art optical dispersion measurement apparatus and methods, in the measurement of group velocity dispersion using the pulse-delay method, phase-shift method or baseband AM response method, it was necessary to use an optical detector, oscilloscope or network analyzer with a broad range of frequency capabilities of from several to several tens of gigahertz.

Based on a consideration of the foregoing, an objective of the present invention is to provide an optical dispersion measurement apparatus, and a method using the same, that has a simple configuration that helps to reduce the cost of measuring optical dispersion.

SUMMARY OF THE INVENTION

To attain the above objective, the present invention provides an optical dispersion measurement apparatus that comprises: means for generating a light beam; means for inputting the generated light beam to a first terminal of an optical distributor; means for outputting the input light beam as a plurality of light beams; optical modulation means for modulating at least two of the plurality of light beams; an optical path via which the at least two modulated light beams are returned to the optical distributor; means for outputting the light beams returned to the optical distributor from a second terminal of the optical distributor; means for detecting light output from the second terminal; and means for relating an intensity of the detected light to an optical modulation frequency.

The present invention further provides an optical dispersion measurement apparatus that comprises: means for generating a light beam; means for inputting the generated light beam to a first terminal of an optical distributor; means for outputting the input light from a third terminal and a fourth terminal of the optical distributor; light modulation means for modulating light traveling from the third terminal to the fourth terminal and light traveling from the fourth terminal to the third terminal; means for outputting from a second terminal of the optical distributor modulated light traveling from the third terminal to the fourth terminal and from the fourth terminal to the third terminal; means for detecting the light output from the second terminal; and means for relating an intensity of the detected light to an optical modulation frequency.

The present invention further provides an optical dispersion measurement apparatus that comprises: means for generating a light beam; means for inputting the generated light beam to a first terminal of an optical distributor; means for converting the light beam input to the first terminal of the optical distributor into two component beams having an orthogonal polarization relationship; means for modulating one component beam before the beam is passed through a measurement object and modulating the other component beam after it has passed through the measurement object; means for returning the two modulated component beams to the optical distributor; means for outputting the two modulated component beams from a second terminal of the optical distributor; means for detecting light having a predetermined polarization output from the second terminal; and means for relating an intensity of the detected light to an optical modulation frequency.

In order to obtain the optical group velocity dispersion, any one of the aforementioned optical dispersion measurement apparatus includes means for generating a wavelength-tunable light beam.

Each of the first to third mentioned dispersion measurement apparatus includes means for adjusting a length of an optical path used to return light output from the optical distributor back to the optical distributor.

The optical dispersion measurement apparatus in which the optical distributor has the first to fourth terminals includes first polarization control means for adjustment of light traveling from the third terminal to the fourth terminal, and second polarization control means for adjustment of light traveling from the fourth terminal to the third terminal.

In each of the first to third mentioned apparatus, the measurement object is located on part of the optical path.

A portion of each of the first to third mentioned apparatus that does not include the measurement object is disposed in a gas or a pressure-reduced gas, making the dispersion in that portion negligibly small. To measure the dispersion in that portion, the apparatus further includes optical reflection means constituting part of the optical path.

To measure the distance to an object, each of the first to third mentioned apparatus further includes optical reflection means disposed at the measurement object located on part of the optical path.

In order to enable use of an optical modulator having normal directionality, any one of the aforementioned apparatus includes at least one pair of optical modulators that comprise optical modulators having mutually opposed forward modulation directions.

To ascertain whether or not the target optical path has been formed, in the first or second mentioned apparatus a 90-degree Faraday rotator is provided on the optical path whereby light output from the second terminal of the optical distributor is increased when the light is not modulated compared to when the light is modulated, or is decreased when the light is not modulated compared to when the light is modulated.

The present invention additionally provides a measurement method using the above optical dispersion measurement apparatus, that comprises the steps of: using a light generation means to generate a light beam; inputting the generated light beam to a first terminal of an optical distributor; outputting the input light beam as a plurality of light beams; modulating at least two of the plurality of light beams; returning the at least two light beams to the optical distributor, outputting the returned light beams from a second terminal of the optical distributor; detecting the light beams output from the second terminal; and relating an intensity of the detected light to an optical modulation frequency.

The present invention further provides a measurement method using the above optical dispersion measurement apparatus, that comprises the steps of using a light generation means to generate a light beam; inputting the generated light beam to a first terminal of an optical distributor; outputting the input light beam from third and fourth terminals of the optical distributor; guiding the light beams output from the third and fourth terminals to a single optical path so that the beams travel along the optical path in mutually opposite directions; modulating light traveling along the optical path from the third terminal to the fourth terminal and modulating light traveling along the optical path from the fourth terminal to the third terminal; outputting to a second terminal of the optical distributor the modulated light traveling from the third terminal to the fourth terminal and the modulated light traveling from the fourth terminal to the third terminal; detecting the light output from the second terminal; finding a periodicity in a relationship between an optical modulation frequency and an optical intensity of the light output from the second terminal; and obtaining a wavelength dispersion characteristic of the optical path from a dependency of the periodicity on a wavelength of the light input to the first terminal.

The present invention further provides a measurement method using the above optical dispersion measurement apparatus, that comprises the steps of: using a light generation means to generate a light beam; inputting the generated light beam to a first terminal of an optical distributor; converting the light beam input to the first terminal of the optical distributor into two component beams having an orthogonal polarization relationship; modulating one of the component beams before the beam is passed through a measurement object and modulating the other component beam after it has been passed through the measurement object; returning the two modulated component beams to the optical distributor; outputting the two modulated component beams from a second terminal of the optical distributor; detecting light having a predetermined polarization output from the second terminal; and relating an intensity of the detected light to an optical modulation frequency.

The present invention further provides to a method of using an optical dispersion measurement apparatus having at least four terminals to measure a length of an optical path and changes in the length of the optical path. The method comprises the steps of: using a light generation means to generate a light beam; inputting the generated light beam to a first terminal of an optical distributor; outputting the input light beam from third and fourth terminals of the optical distributor; guiding the light beams output from the third and fourth terminals to a substantially single optical path so that the beams travel along the optical path in mutually opposite directions; modulating light traveling along the optical path from the third terminal to the fourth terminal and modulating light traveling along the optical path from the fourth terminal to the third terminal, using a modulation signal having a periodic frequency that is not less than a periodicity found in an optical intensity relationship of light output from a second terminal of the optical distributor; outputting from the second terminal of the optical distributor the modulated light traveling from the third terminal to the fourth terminal and the modulated light traveling from the fourth terminal to the third terminal; detecting the light output from the second terminal; finding a periodicity in a relationship between an optical modulation frequency and an optical intensity of the light output from the second terminal; and using the periodicity to obtain a length of the optical path and changes in the length.

The present invention further provides a method of using an optical dispersion measurement apparatus having optical reflection means disposed at a measurement object located on part of an optical path and at least three terminals to measure a length of the optical path and changes in the length of the optical path. This method is used to measure fine changes in optical path length. For this purpose, this method comprises the steps of: using a light generation means to generate a light beam; inputting the generated light beam to a first terminal of an optical distributor; converting the light beam input to the first terminal of the optical distributor into two component beams having an orthogonal polarization relationship; modulating one of the component beams before the beam is passed through the measurement object, using a modulation signal having a periodic frequency that is not less than a periodicity found in an optical intensity relationship of light output from a second terminal of the optical distributor; using a modulation signal having the same frequency to modulate the other component beam after it has been passed through the measurement object; returning the two modulated component beams to the optical distributor; outputting the two modulated component beams from the second terminal of the optical distributor; detecting light having a predetermined polarization output from the second terminal; and relating an optical intensity of the detected light to an optical modulation frequency, and using the relationship to find the length of the optical path and changes in the length.

As described in the foregoing, by measuring the relationship between detected optical intensity and modulation frequency, the present invention makes it possible to measure optical dispersion using an apparatus having a simpler configuration than a prior art apparatus, thereby helping to reduce the cost.

Further features of the invention, its nature and various advantages will be more apparent from the accompanying drawings and following detailed description of the invention.

BRIEF DESCRIPTION OF THE DRAWINGS

FIG. 11 shows an example of optical fiber measurement results obtained using the apparatus of FIG. 3.

FIG. 15 shows an example of the mean power output of H and V polarization components of light emitted by a modulator that is scanned at a modulation frequency $\omega_m$.

DESCRIPTION OF THE PREFERRED EMBODIMENTS

The present invention provides a method and apparatus for measuring group velocity dispersion of optical fibers. Using this method enables the measurement of group velocity dispersion to be conducted using a simpler apparatus than a prior art apparatus.

Figure 1:
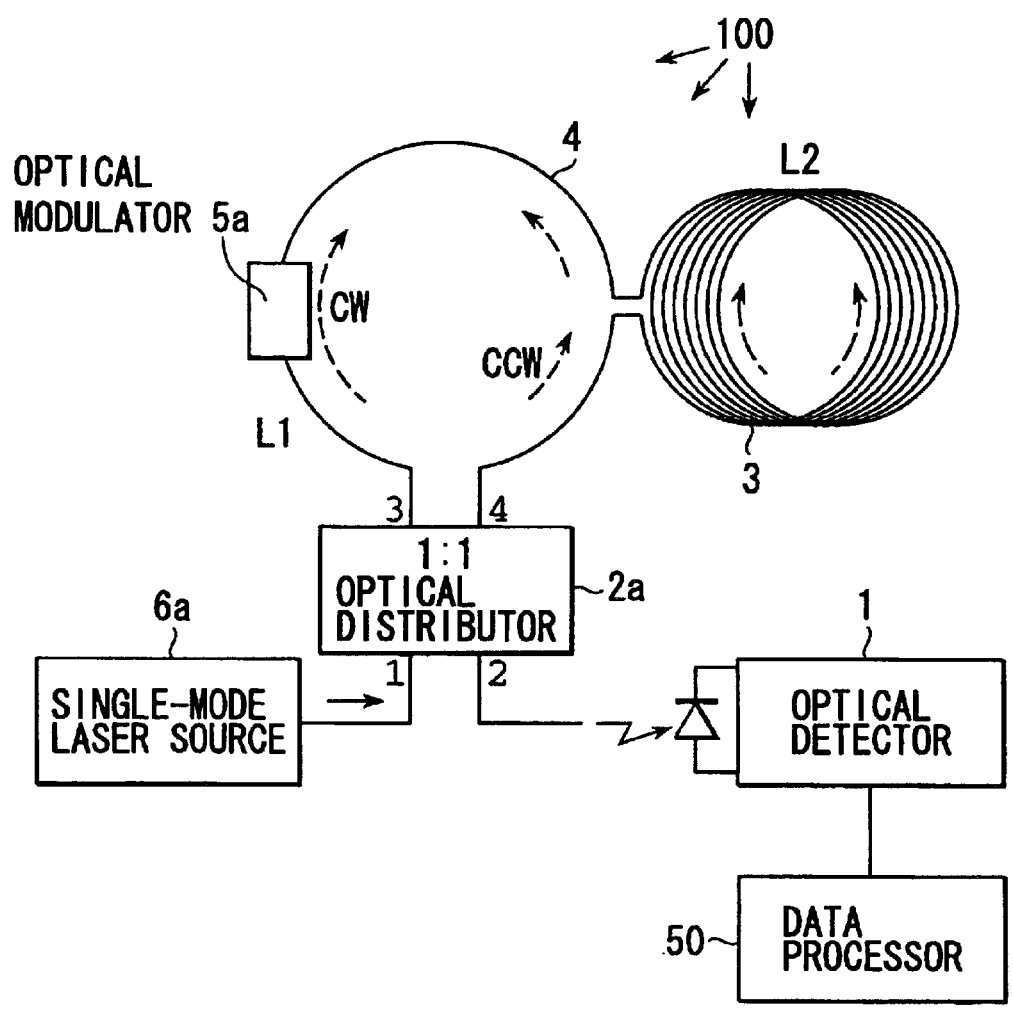
FIG. 1 is a diagram illustrating the optical dispersion measurement method of the present invention.

With reference to FIG. 1, in terms of functional concept this measurement method comprises (1) a method utilizing an interferometer configured as a ring type optical path that includes an optical modulator, and (2) a method that utilizes an interferometer configured as a linear optical path.

(1) Method Utilizing an Interferometer Configured as a Ring Type Optical Path:

The optical dispersion measurement apparatus 100 shown in FIG. 1 comprises a wavelength-tunable single-mode laser 6a used as an optical source, an optical distributor 2a that is a 3-db optical coupler, a phase or intensity modulator 5a, a ring-shaped optical path 4, an optical fiber 3 to be measured, and an optical detector 1. The phase or intensity modulator 5a is positioned asymmetrically on the ring. The single-mode laser beam enters via a terminal 1 and is output to terminals 3 and 4 by means of the optical distributor 2a, thereby being divided into two components. The light component exiting the terminal 3 is modulated by the modulator 5a and is input to one end of the optical fiber 3. The other light component exiting the terminal 4 is input to the other end of the optical fiber 3. In this configuration, the clockwise component input to the optical fiber 3, following modulation by the modulator 5a, is accompanied by modulation sidebands. Light accompanying the sidebands falls incident on the terminal 4 after experiencing a group velocity dispersion effect in its passage through the optical fiber 3. However, after passing through the optical fiber 3, the counter-clockwise light component is modulated and therefore falls incident on the terminal 3 without experiencing the group velocity dispersion of the optical fiber 3. The light components falling incident on the terminals 3 and 4 are output from a terminal 2, in the course of which they interfere with each other and, over time, the effect of the dispersion is that the mean output power exhibits a dependency on the modulation frequency. If the optical detector 1 is used to measure the mean of light output from the terminal 2 and the modulation frequency is scanned, interference fringes having a periodic structure can be observed. Furthermore, changing the source wavelength produces a fringe shift. This can be used to measure the optical wavelength dispersion. This is described in detail below.

As shown in FIG. 1, the optical path comprises an optical fiber L1, an optical phase modulator 5a and an optical fiber L2. The letters "CW" are used to indicate light traveling clockwise, and "CCW" to indicate light traveling counter-clockwise. If denoted by $E_i$ is the electric field intensity of the incident light, $\omega_o$ is the optical angular frequency, t is the time and $L_1$ is the distance the light travels in the optical fiber L1, $\beta_{o1}$ is the propagation constant of the light with the angular frequency $\omega_o$ in the optical fiber L1, then incident light traveling clockwise can be expressed as follows.

$$E_{CW}(t) = \frac{E_i}{\sqrt{2}} \exp(i\omega_o t) \qquad (1)$$

Light traveling counterclockwise is expressed as follows.

$$E_{CCW}(t) = \frac{iE_i}{\sqrt{2}} \exp(i\omega_o t) \qquad (2)$$

Also, as a result of the propagation of the light in the optical fiber L1, the electric field of the light will be expressed as follows.

$$E_{CW}(t) = \frac{E_i}{\sqrt{2}} \exp(i\omega_o t) \exp(-i\beta_{o1} L_1) \qquad (3)$$

When the light beam is subsequently phase-modulated at an angular frequency $\omega_m$ and a modulation index $M_1$, the electric field will be expressed as follows.

$$E_{CW}(t) = \frac{E_i}{\sqrt{2}} \exp(i\omega_o t) \exp(-i\beta_{o1} L_1) \exp[iM_1 \cos(\omega_m t)] \qquad (4)$$

In regions where $M_1 \ll 1$, the following approximation can be applied.

$$\exp[iM_1 \cos(\omega_m t)] \approx 1 + i M_1 [\exp(i\omega_m t) + \exp(-i\omega_m t)]/2 \qquad (5)$$

Thus, in the regions where $M_1 \ll 1$, it can be seen that light with the angular frequency $\omega_o$ subjected to phase-modulation at the angular frequency $\omega_m$ will generate the two sidebands at angular frequencies of $\omega_o - \omega_m$ and $\omega_o + \omega_m$.

If denoted by $\beta_{o2}$ is the propagation constant in respect of the light propagating in the optical fiber L2 having an angular frequency $\omega_o$, first-order approximation can be used to extend this to $\beta_{o2} - \beta_{12} \cdot \omega_m$ in respect of the light of the angular frequency $\omega_o - \omega_m$, and to $\beta_{o2} + \beta_{12} \cdot \omega_m$ in respect of the light of the angular frequency $\omega_o + \omega_m$. Here, $\beta_{12}$ corresponds to the reciprocal of the group velocity of the light in the fiber L2. Therefore, the following approximation can be used with respect to the light travelling clockwise.

$$E_{CW}(t) = \qquad (6)$$
$$\frac{E_i}{\sqrt{2}} \exp(i\omega_o t - i\beta_{o1} L_1 - i\beta_{o2} L_2)[1 + iM_1 \cos(\omega_m t - \beta_{12} \omega_m L_2)]$$

Using the same method, the following approximation can be applied with respect to the light traveling counterclockwise.

$$E_{CCW}(t) = \qquad (7)$$
$$\frac{iE_i}{\sqrt{2}} \exp(i\omega_o t - i\beta_{o1} L_1 - i\beta_{o2} L_2)[1 + iM_2 \cos(\omega_m t - \beta_{11} \omega_m L_1)]$$

Here, $\beta_{11}$ is equivalent to the reciprocal of the group velocity of the light in the fiber $L_1$.

When these light components are combined by the optical distributor 2a, the electric field intensity $E_o$ of the combined light can be expressed as follows.

$$E_o(t) = \frac{E_{CW}(t) + iE_{CCW}(t)}{\sqrt{2}} \qquad (8)$$
$$= \frac{iE_i}{2} \exp(i\omega_o t - i\beta_{o1} L_1 - i\beta_{o2} L_2) \times [M_1 \cos(\omega_m t - \beta_{12} \omega_m L_2) - M_2 \cos(\omega_m t - \beta_{11} \omega_m L_1)]$$

Therefore, the optical intensity will be expressed as follows.

$$E_o(t)\overline{E_o(t)} = \frac{E_i^2}{4} [M_1 \cos(\omega_m t - \beta_{12} \omega_m L_2) - M_2 \cos(\omega_m t - \beta_{11} \omega_m L_1)]^2 \qquad (9)$$

Taking the mean optical intensity over an extended period gives us the following.

$$\langle E_o(t)\overline{E_o(t)} \rangle = \frac{E_i^2}{8} \left[ (M_1 - M_2)^2 + 4M_1 M_2 \sin^2\left(\frac{\beta_{12}\omega_m L_2 - \beta_{11}\omega_m L_1}{2}\right) \right] \qquad (10)$$

Here, $\omega_m \ll \omega_o$, so when the length $L_1$ of the ring-shaped optical path 4 is shorter than the length $L_2$ of the optical path constituted by the optical fiber being measured, so that $L_1 \ll L_2$, equation 10 can be approximated using the following equation.

$$\langle E_o(t)\overline{E_o(t)} \rangle \cong \frac{E_i^2}{2} \left[ \frac{1}{4}(M_1 - M_2)^2 + M_1 M_2 \sin^2\left(\frac{\beta_{12}\omega_m L_2}{2}\right) \right] \qquad (11)$$

This being the case, by varying $\omega_m$ while observing the mean output of light exiting terminal 2, fringes will be observed. If for simplicity the discussion is limited to the object of measurement and $\beta_{12}$ is denoted as $\beta_1$ and $L_2$ as L, the period $f_c$ can be expressed as follows.

$$f_C = \frac{1}{\beta_1 L} \qquad (12)$$

Again, from equation 11, the frequency $f_o$ corresponding to the minimum optical intensity can be expressed as follows.

$$f_O = \frac{N}{\beta_1 L} = N \cdot f_C \qquad (13)$$

Here, N is a positive integer. Since $\beta_1$ is normally a function of the wavelength of the light, at a given N value, changing the wavelength of the incident light will also result in a change in the modulation frequency $f_o$. From equation 13, group velocity dispersion D can be expressed as follows.

$$D = \frac{\Delta \beta_1}{\Delta \lambda} = \frac{-1}{L f_O f_C} \cdot \frac{\Delta f_O}{\Delta \lambda} \qquad (14)$$

An interference fringe can be obtained at a desired wavelength by scanning the modulation frequency while using optical detector 1 to detect the output light and using a recorder or computer for observation. An interference fringe is obtained even if the light is modulated at a frequency in which N is very large. Next, the wavelength of the incident light beam is changed by $\Delta\lambda$ and the modulation frequency is again scanned to obtain an interference fringe at a wavelength $\lambda + \Delta\lambda$. If the wavelength change $\Delta\lambda$ results in a fringe shift of $\Delta f_o$ along the frequency axis, equation 14 can be used to obtain the group velocity dispersion.

The foregoing explanation has been made with reference to modulation indices $M_1$ and $M_2$ that are very small. However, using a Bessel function to extend the phase-modulation term enables an approximation to be used that holds true up to $M_1$ and $M_2$ each in the order of 2.

$$\exp[iM_1 \cos(\omega_m t)] \cong J_0(M_1) + iJ_1(M_1)\exp(i\omega_m t) + \quad (15)$$
$$iJ_1(M_1)\exp(-i\omega_m t) -$$
$$J_2(M_1)\exp(i2\omega_m t) -$$
$$J_2(M_1)\exp(-i2\omega_m t) + \ldots$$

Similarly, the following equation can be obtained.

$$\exp[iM_2 \cos(\omega_m t)] \cong J_0(M_2) + iJ_1(M_2)\exp(i\omega_m t) + \quad (16)$$
$$iJ_1(M_2)\exp(-i\omega_m t) -$$
$$J_2(M_2)\exp(i2\omega_m t) -$$
$$J_2(M_2)\exp(-i2\omega_m t) + \ldots$$

By using these approximations, the optical power $P_o$ of the combined clockwise and counterclockwise components can be expressed as follows.

$$P_o \cong \frac{P_i}{2}[\{J_0(M_1) - J_0(M_2)\}^2/2 + \{J_1(M_1) - J_1(M_2)\}^2 + \quad (17)$$
$$4J_1(M_1)J_1(M_2)\sin^2\left(\frac{\beta_{12}\omega_m L_2 - \beta_{11}\omega_m L_1}{2}\right) +$$
$$\{J_2(M_1) - J_2(M_2)\}^2 + 4J_2(M_1)J_2(M_2)\sin^2(\beta_{12}\omega_m L_2 - \beta_{11}\omega_m L_1)]$$

Here, $\omega_m \ll \omega_o$, so when optical path length $L_1$ is shorter than the optical path length $L_2$, so that $L_1 \ll L_2$, if, again, for simplicity the discussion is limited to the object of measurement and $\beta_{12}$ is denoted as $\beta_1$ and $L_2$ as L, the following relationship can be derived.

$$P_o \cong \frac{P_i}{2}[\{J_0(M_1) - J_0(M_2)\}^2/2 + \{J_1(M_1) - J_1(M_2)\}^2 + \quad (18)$$
$$4J_1(M_1)J_1(M_2)\sin^2\left(\frac{\beta_1 \omega_m L}{2}\right) + \{J_2(M_1) - J_2(M_2)\}^2 +$$
$$4J_2(M_1)J_2(M_2)\sin^2(\beta_1 \omega_m L)]$$

Figure 2:
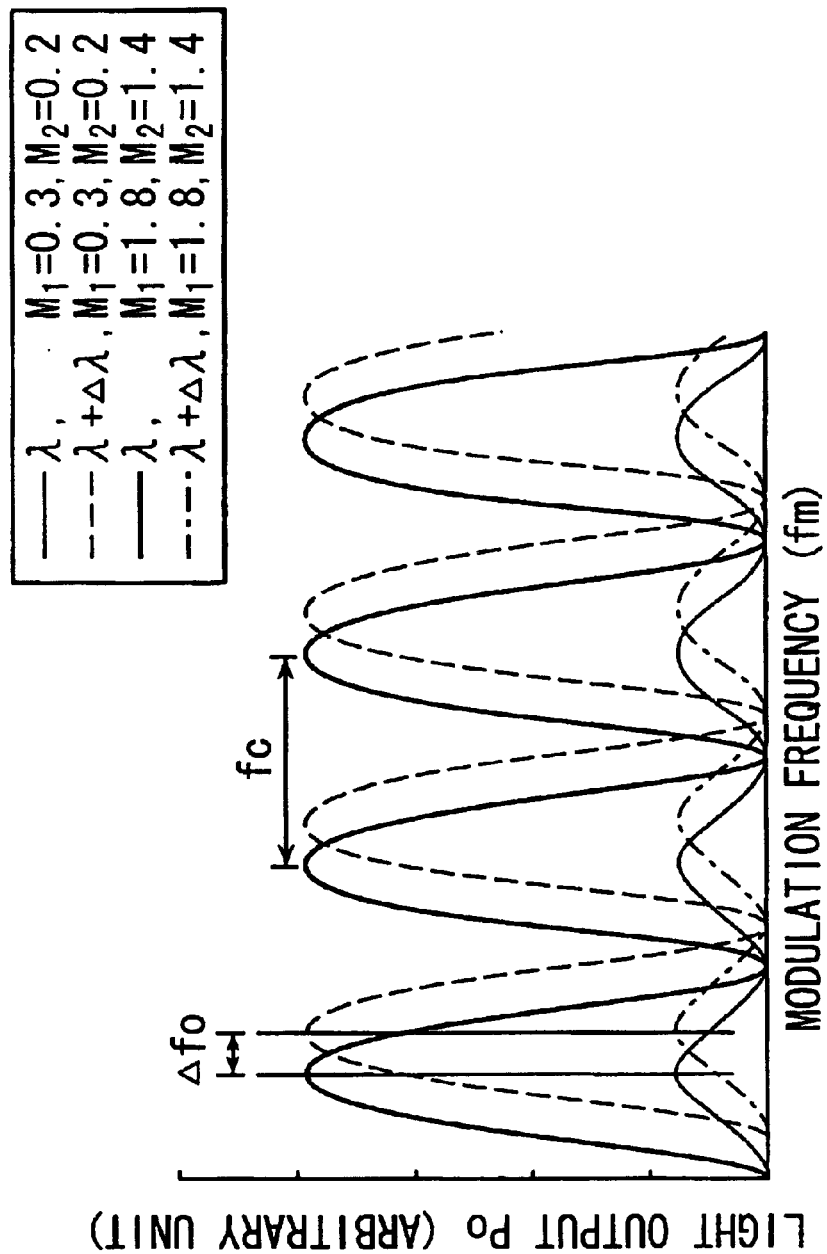
FIG. 2 shows an example of the result of a numerical calculation of the relationship between optical intensity and modulation frequency obtained using the optical dispersion measurement and measurement method of the present invention.

As in the case of the derivation using the above approximation, with N as a positive integer, it can be seen that at the modulation frequency of equation 13, a very small value can be assumed. Thus, two approximation methods provide the same result. With respect to $P_o$, FIG. 2 shows a calculated result. FIG. 2 shows two types of phase modulation indices: $M_1=0.3$, $M_2=0.2$, and $M_1=1.8$, $M_2=1.4$. The fringes show a gradual departure from the sine function shape, but it can be seen that there is no change in the frequencies corresponding to the maximum and minimum points. This shows that equations 12, 13 and 14 are not dependent on the index of phase-modulation and can be used over a wide range.

The foregoing explanation was made with reference to a group velocity dispersion related method. However, the interferometer shown in FIG. 1 can also be used to measure the length of optical fibers. Based on equation 12, the length of an optical fiber can be expressed by the following equation.

$$L = \frac{1}{\beta_1 f_c} = \frac{C}{f_c N_g} \quad (19)$$

Here, denoted by C is the velocity of light and $N_g$ is the refractive index of the optical fiber. The length L of the fiber can be found by scanning the modulation frequency and deriving the value of $f_c$ from the interference fringes seen in the output. As understood from equation 11, when scanning of the modulation frequency is effected, the extended-time mean intensity $P_o$ is seen as an interference fringe akin to a sine function, as shown in FIG. 2. When the modulation index is the same in both the clockwise and counterclockwise directions ($M_1=M_2$), at a specific modulation frequency light output will be seen to approach to zero in the interference fringe. However, when the modulation indices in the two directions are different, the minimum output at the interference fringe does not fall to zero.

The measurement apparatus and method described above uses a ring-type interferometer that includes optical modulators. However, the same effect can be achieved with another new measurement method and apparatus that uses a linear interferometer. In the linear interferometer of this apparatus, the two clockwise and counterclockwise light components of the ring interferometer are replaced by two orthogonally polarized components that have been passed through the same light path. The operating principle is discussed below.

Figure 13:
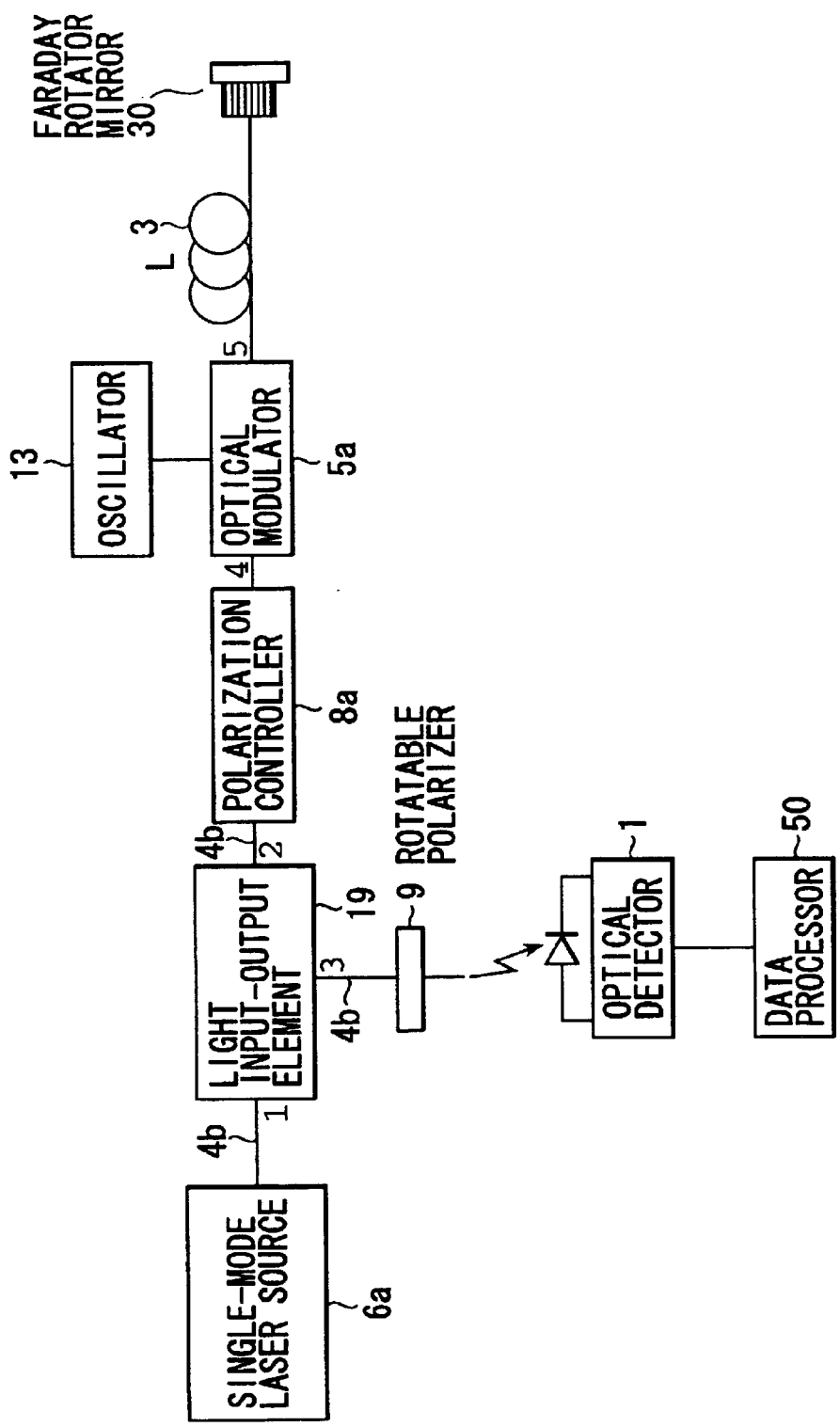
FIG. 13 is a block diagram of an optical dispersion measurement apparatus according to the present invention that uses a linear interferometer.

(2) Method Utilizing an Interferometer Configured as a Linear Optical Path:

FIG. 13 is a block diagram of a dispersion measurement apparatus that utilizes a linear interferometer. The interferometer comprises a wavelength-tunable single-mode laser 6a used as the optical source, an optical input/output element 19 for handling optical input and output to and from the interferometer, a polarization controller 8a, a phase or intensity modulator 5a, a test fiber 3, a Faraday rotator mirror 30, a rotatable polarizer 9, an optical detector 1 and a data processor 50.

Figure 14A:
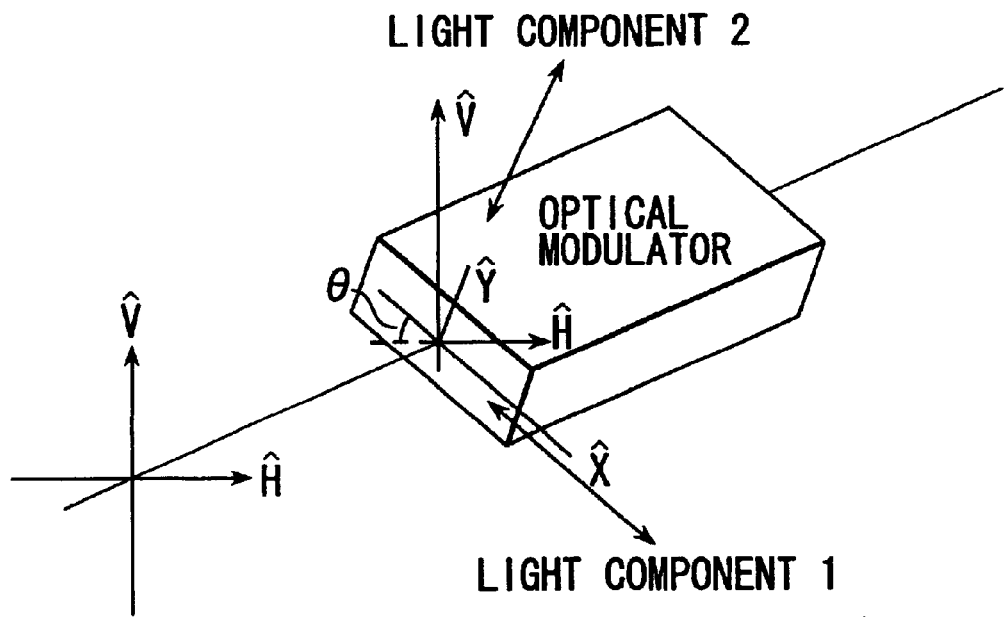
FIG. 14(a) depicts the relationship between incident light and the axis of the optical modulator in the measurement apparatus of FIG. 13.

As shown in FIG. 14(a), the X and Y axes of the optical modulator, which corresponds to the axes along which modulation occurs with maximum or minimum indices, respectively, are adjusted to be at an angle (optimally 45 degrees) to the polarization (H polarized light) of incident light. When linearly polarized light from the laser source passes through the input/output element 19 and falls incident on the optical modulator, this angle enables the light to be divided into a first light component-1 and a second light component-2 having polarization components aligned with the X and Y axes. In particular, when the angle θ is 45 degrees, the component-1 and component-2 are in an orthogonal relationship that enables just the component-1 to be modulated as it passes through the optical modulator. Because the component-2 is aligned in the Y direction it is not modulated. With reference to FIG. 13, the light components pass through the light path that includes the test fiber 3 and are reflected by the Faraday rotator mirror 30 back to the modulator 5a. As shown in FIG. 14, due to the 90 degree rotation caused by the Faraday rotator mirror 30, the light component-1 along the X axis is turned by 90 degree, and becomes a light component-2 along the Y direction. Similarly, the component-2 is turned from the Y to the (-X) direction, and becomes a light component-1 along the X axis. During the second passage through the modulator 5a, only the light component-2 is modulated.

During the passage of the component-1 and component-2 through the test fiber 3, only the light component-1 has sidebands generated by the modulation, so only that component is affected by the group velocity dispersion of the fiber. Thus, the two orthogonal polarization components of the linear interferometer can be thought of as corresponding to the clockwise and counterclockwise light components of the ring-type resonator described above.

After the incident light has been passed in each direction through the modulator 5a, the interference between the two light components can be observed by extracting a polarization component that is at 45 degrees to the polarization plane of each component. This can be done by using the rotatable polarizer 9, for example. Owing to the dispersion effect, the mean time-based output will depend on the modulation frequency, so fringes having a periodic structure can be observed by using an optical detector to measure the mean output while scanning the modulation frequency. Also, the fringes can be seen to shift when the wavelength of the optical source is changed. As in the case of the measurement apparatus and method using a ring interferometer that includes an optical modulator, these phenomena can be used to measure the chromatic dispersion of a test fiber. The details will be described below.

With reference to FIG. 13, denoted by L is the length of the test fiber 3, $E_i$ is the electric field intensity of light incident on the modulator 5a, $\omega_o$ is the optical angular frequency, t is time and $\beta_o$ is the propagation constant of light in the test fiber. The X and Y axes of the modulator are at 45 degrees to the polarization of the incident light. When the light falls incident on the modulator, if $E_1$ and $E_2$ are the electric field intensities of the light components having X and Y polarizations, these can be expressed by equations 20 and 21. Thus, the same approach as that described in the foregoing can be used by reading $E_{CW}$ as $E_1$ and $E_{CCW}$ as $E_2$.

$$E_1(t)=(E_i/\sqrt{2})\exp(i\omega_o t) \qquad (20)$$

$$E_2(t)=(E_i/\sqrt{2})\exp(i\omega_o t) \qquad (21)$$

If in the course of the passage of the light component-1 and light component-2 through the modulator, the light component-1 is phase-modulated at angular frequency coefficient $\omega_m$ and modulation index $M_1$, the electric field is expressed as shown in equation 22. Because the light component-2 is in the Y direction in which modulation is difficult to apply, the modulation index thereof can be regarded as zero.

$$E_1(t)=(E_i/\sqrt{2})\exp(i\omega_o t)\exp[iM_1 \cos(\omega_m t)] \qquad (22)$$

In regions where $M_1 \ll 1$, the modulation term can be approximated as shown in equation 23.

$$\exp[iM_1 \cos(\omega_m t)] \approx 1+iM_1[\exp(i\omega_m t)+\exp(-i\omega_m t)]/2 \qquad (23)$$

Thus, light with angular frequency $\omega_o$ subjected to phase-modulation will generate the two sidebands $\omega_o-\omega_m$ and $\omega_o+\omega_m$. If $\beta_o$ is the propagation constant of light of angular frequency $\omega_o$ propagating in the optical fiber, by extension, a first-order approximation gives $\beta_o-\beta_1\cdot\omega_m$ in respect of light of angular velocity $\omega_o-\omega_m$, and $\beta_o+\beta_1\cdot\omega_m$ in respect of light of angular velocity $\omega_o+\omega_m$. $\beta_1$ corresponds to the reciprocal of the group velocity of the light the fiber.

A light component-1 passes through the test fiber 3 and has its polarization rotated 90 degrees by the Faraday rotator mirror 30. The mirror 30 reflects the light components back to the modulator 5a, which it enters via a port-5. Equation 24 shows the field intensity $E_1$ of the light component-1 at this point. Because this component is polarized in the Y direction, it is not modulated on its second passage through the modulator 5a. Therefore, equation 24 still shows what the field intensity $E_1$ of the light component-1 is after it has passed through the modulator 5a.

$$E_1(t)=(E_i/\sqrt{2})\exp(i\omega_o t-i2\beta_o L)[1+iM_L \cos(\omega_m t-2\beta_1\omega_m L)] \qquad (24)$$

Because the light component-2 does not contain any modulation sidebands, it is not affected by group velocity as it travels through the test fiber 3. However, since the polarization of this component is aligned in the X direction by the Faraday rotator mirror 30, when it is reflected back through the modulator 5a, this time it does become modulated. If the index of this modulation is taken to be $M_2$, then the field intensity of the light after it has passed through the modulator is given by equation 25.

$$E_2(t)=(E_i/\sqrt{2})\exp(i\omega_o t-i2\beta_o L)[1+iM_2 \cos(\omega_m t)] \qquad (25)$$

Figure 14B:
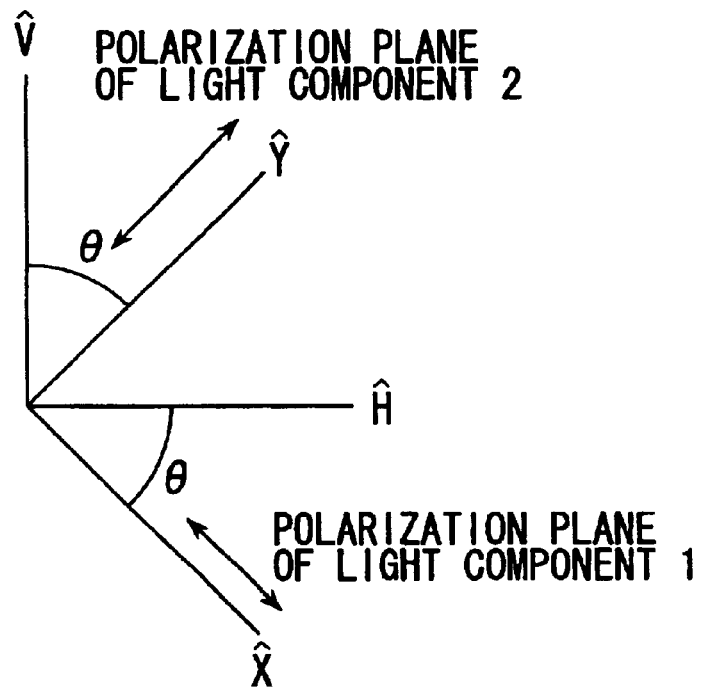
FIG. 14(b) depicts the relationship between the polarization direction and light falling incident on the optical modulator of the measurement apparatus of FIG. 13.

Thus, with reference to FIG. 14(b), $E_1$ and $E_2$ in the incident light polarization directions H and V are shown by equations 26 and 27.

$$E_H(t)=(E_1-E_2)/\sqrt{2}=(E_i/2)\exp(i\omega_o t-i2\beta_o L)[iM_1 \cos(\omega_m t-2\beta_1\omega_m L)-iM_2 \cos(\omega_m t)] \qquad (26)$$

$$E_V(t)=(E_1+E_2)/\sqrt{2}=(E_i/2)\exp(i\omega_o t-i2\beta_o L)[2+iM_1 \cos(\omega_m t-2\beta_1\omega_m L)+iM_2 \cos(\omega_m t)] \qquad (27)$$

Equations 28 and 29 show the time-based mean intensities.

$$<E_H(t)\overline{E}_H(t)>=(E_i^2/8)[(M_1-M_2)^2+4M_1M_2 \sin^2(\beta_1\omega_m L)] \qquad (28)$$

$$<E_V(t)\overline{E}_V(t)>=(E_i^2/8)[8+(M_1+M_2)^2-4M_1M_2 \sin^2(\beta_1\omega_m L)] \qquad (29)$$

Therefore, when the modulation frequency $\omega_m$ is scanned, in the mean output of the two light components emitted from the terminal 4 of the optical modulator with H and V polarizations, there can be seen the type of sine function fringes shown in FIG. 15. FIG. 15 shows an output plotted against modulation frequency and the wavelength of the incident light.

Equation 30 can be used to show the conditions under which the optical intensity is minimized in the case of equation 28, and maximized in the case of equation 29. If the modulation frequency under such a condition is $f_o$, $f_o$ will be as shown in equation 31.

$$\omega_m\beta_1 L = N\pi \qquad (30)$$

$$f_o = \frac{N}{2\beta_1 L} = Nf_c \qquad (31)$$

Here, N is a positive real number. Fringe period $f_c$ is expressed as follows.

$$f_c = \frac{1}{2\beta_1 L} \qquad (32)$$

Since $\beta_1$ is normally a function of the wavelength of the light, at a given value for N, changing the wavelength of the incident light will also result in a change $f_o$. From equation 32, dispersion coefficient D can be expressed by equation 33.

$$D = \frac{\Delta \beta_1}{\Delta \lambda} = \frac{-1}{2Lf_0 f_c} \frac{\Delta f_0}{\Delta \lambda} \tag{33}$$

The two components with H and V polarizations, of light emitted from the modulator 5a in FIG. 13 can be obtained by passing the output through the rotatable polarizer 9 and by adjusting the angle of the polarizer. By using the optical detector 1 to detect the light components having an H or V polarization and using a recorder or computer to measure them, interference fringes can be obtained at a desired wavelength. Interference fringes can be observed even if the light is modulated at a frequency with a very large N value. Next, the wavelength of the incident light beam is changed by $\Delta\lambda$ and the modulation frequency is again scanned to obtain an interference fringe at wavelength $\lambda+\Delta\lambda$. If the wavelength change of $\Delta\lambda$ produces a fringe shift of $\Delta f_o$ along the frequency axis, equation 33 can be used to obtain dispersion parameters.

The foregoing explanation has been made with reference to modulation indices $M_1$ and $M_2$ that are very small. However, with respect also to higher indices of modulation, the phase-modulation effect can be manifested to include higher-order Bessel function sidebands, as in equations 34 and 35. Equations 36 and 37 show the time-based mean output power $P_H$ and $P_V$ in polarization directions H and V.

$$\exp[iM_1 \cos(\omega_m t)] \cong J_o(M_1) + iJ_1(M_1)\exp(i\omega_m t) + \tag{34}$$
$$iJ_1(M_1)\exp(-i\omega_m t) -$$
$$J_2(M_1)\exp(i2\omega_m t) -$$
$$J_2(M_1)\exp(-i2\omega_m t) + \ldots$$

$$\exp[iM_2 \cos(\omega_m t)] \cong J_o(M_2) + iJ_1(M_2)\exp(i\omega_m t) + \tag{35}$$
$$iJ_1(M_2)\exp(-i\omega_m t) -$$
$$J_2(M_2)\exp(i2\omega_m t) -$$
$$J_2(M_2)\exp(-i2\omega_m t) + \ldots$$

$$P_H \cong \frac{P_i}{2}[\{J_0(M_1) - J_0(M_2)\}^2/2 + \{J_1(M_1) - J_1(M_2)\}^2 + \tag{36}$$
$$4J_1(M_1)J_1(M_2)\sin^2(\beta_1\omega_m L) + \{J_2(M_1) - J_2(M_2)\}^2 +$$
$$4J_2(M_1)J_2(M_2)\sin^2(2\beta_1\omega_m L)]$$

$$P_V \cong \frac{P_i}{2}[\{J_0(M_1) + J_0(M_2)\}^2/2 + \{J_1(M_1) + J_1(M_2)\}^2 - \tag{37}$$
$$4J_1(M_1)J_1(M_2)\sin^2(\beta_1\omega_m L) + \{J_2(M_1) + J_2(M_2)\}^2 -$$
$$4J_2(M_1)J_2(M_2)\sin^2(2\beta_1\omega_m L)]$$

As in the foregoing case of derivation by approximation, with N as a positive real number, at the modulation frequency of equation 31, the output will be minimum in the case of equation 36 and maximum in, the case of equation 37.

In the above-described measurement method using a ring interferometer that includes an optical modulator and dispersion measurement method utilizing a linear interferometer, dispersion is measured while scanning the modulation frequencies. These methods enable the use of electrical techniques as means for obtaining fringes, and therefore have the merit of enabling the measurement to be speedily accomplished.

Figure 16:
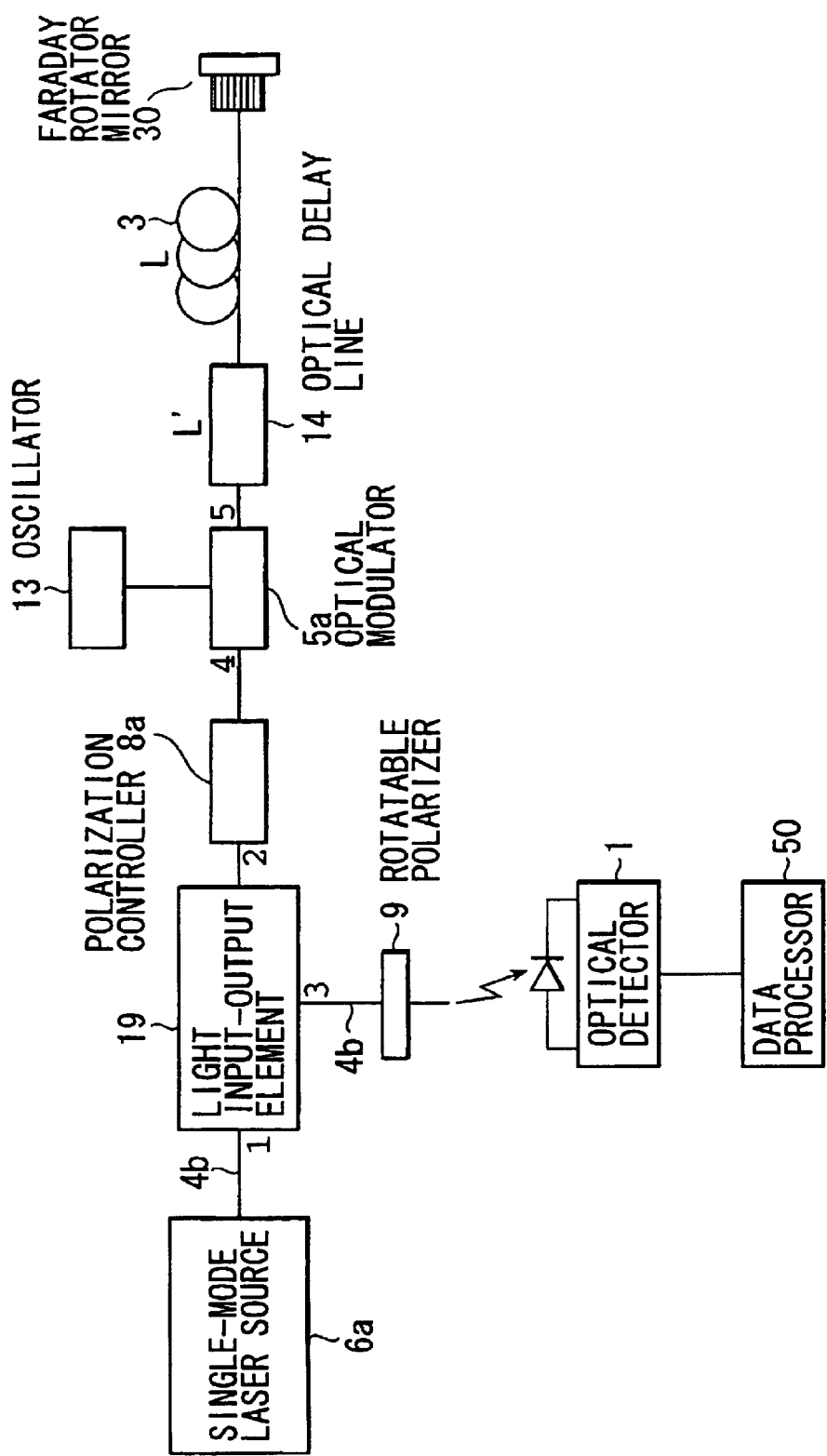
FIG. 16 is a block diagram showing the configuration of a measurement apparatus that uses a mechanical arrangement to obtain fringes.

Costs can be reduced by, for example, using an apparatus configured to obtain fringes by mechanical means. With such a configuration, modulation is performed at a constant frequency, and basically there is no need for modulation frequency scanning. The working concept is explained below, with reference to FIG. 16. The basic configuration is similar to that of FIG. 13, with the difference being an optical delay line 14 between the modulator 5a and the Faraday rotator mirror 30 that is used to vary the length of the optical path. Thus, the feature of this measurement method is that dispersion is measured by varying the delays.

If L' is the optical path length of the delay line, equation 30 can be replaced by equation 38.

$$\omega_m(\beta_1 L + L'/c) = N\pi \tag{38}$$

From equation 38, it can be seen that when delay L' is scanned at a given angular modulation frequency $\omega_m(=2\pi f_m)$, the intensity of light having an H or V polarization component undergoes periodic changes.

If $L_o'$ is the length of the optical delay at which the intensity of the H component is at the minimum point in the case of equation 28, and the intensity of the V component is at the maximum point in the case of equation 29, $L_o'$ can be expressed by equation 39, in which modulation frequency fm is fixed and N is a positive real number.

$$L_o' = c(N/2f_m - \beta_1 L) \tag{39}$$

Figure 17:
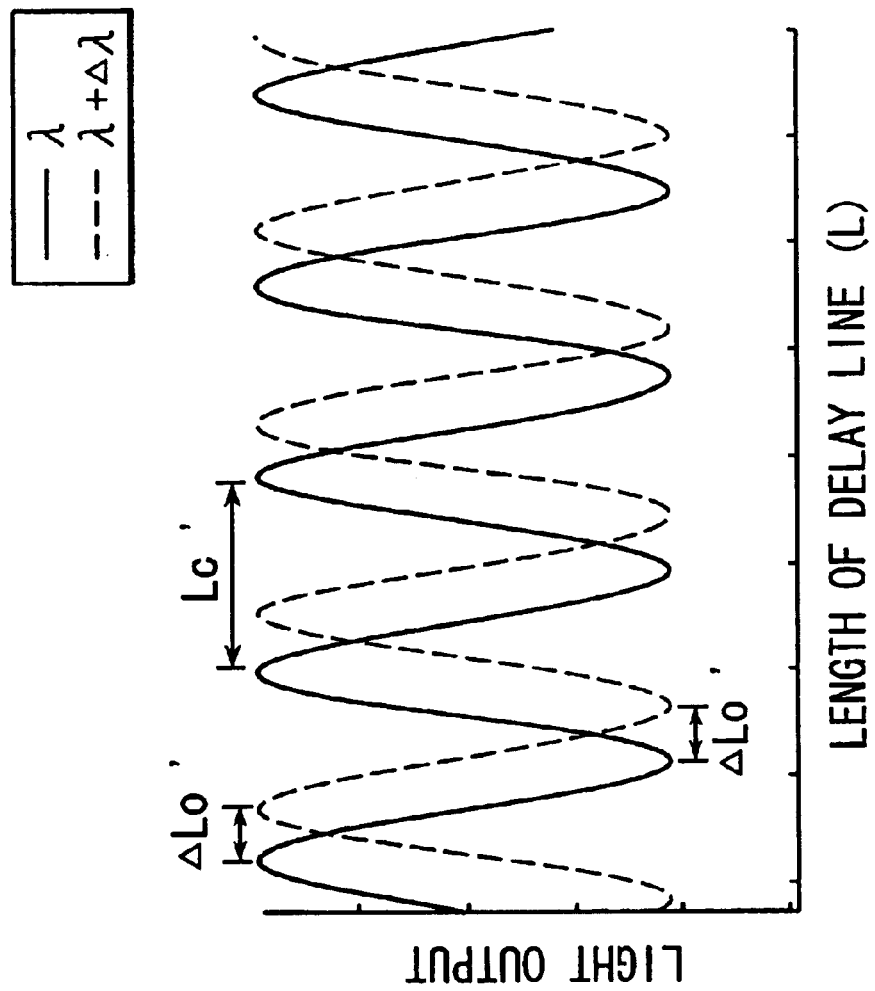
FIG. 17 shows changes in output relative to the length of the optical delay line and wavelength of the incident light.

The delay $L_c'$ needed to obtain one complete fringe as shown in FIG. 17 can be obtained from equation 40.

$$L_c' = c/2f_m \tag{40}$$

$\beta_1$ is generally a function of wavelength, so it can be understood that changing the incident wavelength also changes the value of $L_o'$. Based on equation 39, optical dispersion parameter D can be represented by using equation 41.

$$D = \frac{\Delta\beta_1}{\Delta\lambda} = -\frac{1}{cL}\left(\frac{\Delta L_o'}{\Delta\lambda}\right) \tag{41}$$

Mechanical measurement of dispersion can also be achieved with the ring type interferometer shown above, by using an optical delay line that can vary the length of the optical path in the interferometer.

Measurement of the fiber length and of the distance to an object will now be explained.

The above "method utilizing an interferometer configured as a linear optical path" was described with reference to a method of measuring group velocity dispersion. However, the interferometer shown in FIG. 13 can be used to measure the length of an optical fiber. Also, based on equation 32, the length of a fiber can be shown by equation 42.

$$L = \frac{1}{2\beta_1 f_c} = \frac{c}{2n_g f_c} \tag{42}$$

Here, c is the velocity of the light, and $n_g$ is the group refractive index. The length L of an optical fiber can be found by scanning the modulation frequency and using interference fringes appearing in the output to measure a fringe period $f_c$.

If the optical path from the optical modulator to the Faraday rotator mirror is in air or in a reduced pressure environment (disposing the Faraday rotator mirror at the object position and measuring the distance to the object is one example of such a case), 1 can be used as the value of $n_g$.

The technique of measuring the changes in fiber length, or the changes in the distance to the object by scanning the modulation frequency, will now be explained.

According to FIG. 13, if L is the distance to the object or the fiber length, equation 43 can be used to obtain a change ΔL in the length.

$$\Delta L = -\frac{N}{2f_0^2 \beta_1} \Delta f_0 = -\frac{1}{2f_0 \beta_1}\left(\frac{\Delta f_0}{f_c}\right) \quad (43)$$

If the optical path from the optical modulator to the Faraday rotator mirror is in air or in a reduced pressure environment, $\beta_1$ can be taken as 1/c. Since any change in the length causes a fringe shift, the change in the length can be obtained from the shift $\Delta f_o$.

Next, measurement of the changes in optical fiber length or changes in distance to an object by scanning the delay line will be explained. Equation 44 shown below is used to show the change ΔL in a distance to an object or in the length L of the fiber used in FIG. 16.

$$\Delta L = -\frac{1}{c\beta_i}\Delta L'_o = -\frac{\Delta L'_o}{n_g} \quad (44)$$

If the optical path from the optical modulator to the Faraday rotator mirror is in air, $\beta_1$ can be taken as 1/c and $n_g$ as 1. This being the case, any change in the length will be accompanied by a fringe shift, enabling the change in length to be found from the fringe shift $\Delta L_o'$. Thus, as is the case with the ring type interferometer, changes in the length or distance can be measured.

A method of improving measurement resolution will now be described. In the case of this method, when dispersion or distance is measured using frequency scanning, the greater the ratio between fringe shift $\Delta f_o$ and fringe period $f_c$, the smaller the measurement error.

The value of ($\Delta f_o/f_c$) is shown by equation 45 below, from which it can be seen that a higher modulation frequency results in a correspondingly higher measurement precision.

$$(\Delta f_0/f_c) = -2DLf_o(\Delta\lambda) \quad (45)$$

On the other hand, when the optical delay line is adjusted and the length of its optical path is scanned to measure dispersion or the changes in distance, the larger the fringe shift $\Delta L_o'$ is in relation to fringe period $L_c'$, the more precise the measurement becomes. The value of ($\Delta_o'/L_c'$) is shown by equation 46 below, from which it can be seen that here too, a higher modulation frequency results in a correspondingly higher measurement precision.

$$(\Delta L_o'/L_c') = -2DLf_m(\Delta\lambda) \quad (46)$$

Optical modulators capable of modulation frequencies of several tens of gigahertz are commercially available. Most of the optical modulators having such capabilities manufactured for optical communications applications are of the travelling-wave type, and can therefore effect modulation with respect to forward-proopagating light but not to light in the opposite direction. This means that the present invention cannot use such modulators as they are. However, this is a problem that can be resolved by the arrangement shown in FIG. 29. Specifically, two waveguide type optical modulators 5a are used, connected in series with their forward directions oriented in opposite directions, as indicated by the arrows. Thus, modulation can be effected in both directions by applying the same modulation signal to each modulator. This modulator configuration can be applied to measuring systems that use ring interferometers as well as to systems using linear interferometers. The ability to use such high-frequency optical modulators makes it possible to improve system measurement precision. This embodiment of the present invention will now be described with reference to the drawings. In the drawings, the same reference numerals and symbols are used to denote parts and functions that are the same, and accordingly, in some cases further explanations and descriptions thereof are omitted.

Figure 3:
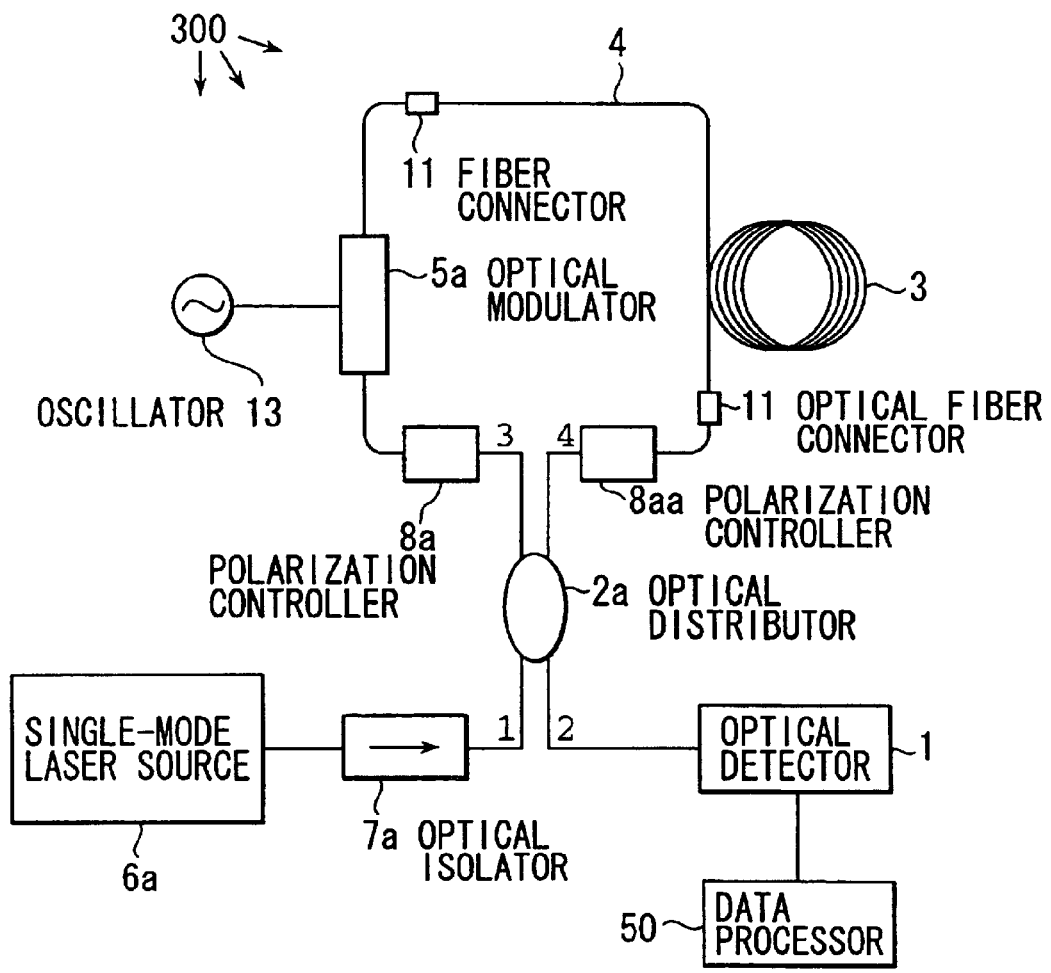
FIG. 3 is a diagram for explaining a first embodiment of the optical dispersion measurement apparatus of this invention.

A first embodiment of the optical dispersion measurement apparatus according to the present invention will now be explained with reference to FIG. 3. This shows an optical dispersion measurement apparatus 300 that includes a wavelength-tunable single-mode laser 6a as the optical source, an optical isolator 7a to prevent light being reflected back to the laser, polarization controllers 8a and 8aa used to adjust optical polarization, an optical distributor 2a, a phase or intensity modulator 5a, an electrical oscillator 13 for generating modulation signals, a fiber connector 11, a ring-shaped optical path 4, the optical fiber 3 to be measured (test fiber), an optical detector 1 for measuring the output light of the optical dispersion measurement apparatus, and a data processor 50. One end of the test fiber 3 is optically coupled to the modulator, and the other end thereof to the polarization controller 8a. The wavelength-tunable single-mode laser 6a, isolator 7a, optical distributor 2a, polarization controller 8a and modulator 5a are linked by the ring-shaped optical path 4. The polarization controller 8aa with a can be provided between the modulator 5a and the test fiber 3 instead of between the terminal 4 of the optical distributor 2a and the test fiber 3.

For the wavelength-tunable single-mode laser 6a, an external resonator type wavelength-tunable semiconductor laser was used (a 1.50 μm to 1.58 μm Tunics BT model made by Photonetics Company). The modulation frequency was scanned at wavelength intervals of 2.5 nm and the fringes are plotted. The optical distributor 2a was a 4-terminal type (made by Sumitomo Osaka Cement Company) that evenly distributes light input via the terminal 1 to the terminals 3 and 4. The polarization controllers 8a and 8aa were disk type controllers (the MPC 1000 made by Idea Development Company). The modulator 5a was an optical phase modulator with a bandwidth of 8 gigahertz (made by UTP Company). The optical fiber pigtail of the modulator 5a was of a polarization-maintaining type. Using this modulator together with a high-frequency signal generator (model 83620A made by Hewlett-Packard Company) having a sweep function capability in the region of three gigahertz, scanning was performed over the frequency range of 3.0 gigahertz to 3.001 gigahertz and the fringes are measured. The optical detector 1 (model 1811 made by Newfocus Company) had a bandwidth of 125 megahertz.

FIG. 11 shows an example of measurement results. For the measurement, a one-kilometer length of single-mode fiber (SMF) made by Fujikura Company was used. The phase-modulation was performed at modulation indices of $M_1=1.65$ and $M_2=0.9$. FIG. 11 shows the output power from the optical dispersion measurement apparatus as a function of frequency, obtained by sweeping modulation frequencies from 3000 megahertz to 3001 megahertz in respect of incident light wavelengths of 1545 nm, 1550 nm and 1555 nm. A sweep period of 100 milliseconds was used. With this configuration, there is almost no power output from the interferometer when light is not modulated. Bold dots have been placed at the points corresponding to where the value of N in equation 13 is the same. Based on these measurement results, sine wave type fringes were obtained; these fringes were found to have a light wavelength dependency that caused shifting of the fringes. At 1550 nm, the fluctuation period of the optical output with respect to the modulation frequency was 199 kilohertz. Also, when the incident light wavelength was changed from 1545 nm to 1555 nm, the fringe shift was −98 kilohertz. Based on these results, using equation 14, at a center frequency of 1550 nm, a group velocity dispersion D of 16.41 ps/nm/km was obtained. This is very close to the dispersion value of 16.65 ps/nm/km obtained using the phase-shift method, which shows the correctness of the measurement.

As mentioned above, when optical-fiber group velocity dispersion is measured by a prior art pulse-delay method, phase-shift method or baseband AM response method, the optical detectors, oscilloscopes, network analyzers and the like that are used have to have a broad bandwidth capabilities ranging from several gigahertz up to several tens of gigahertz. In comparison, the optical dispersion measurement apparatus of the present invention is simpler and less costly, comprising mainly a wavelength-tunable semiconductor laser, disk type polarization controllers, an optical phase modulator, an electrical oscillator, an optical detector and a data processor.

Figure 30A:
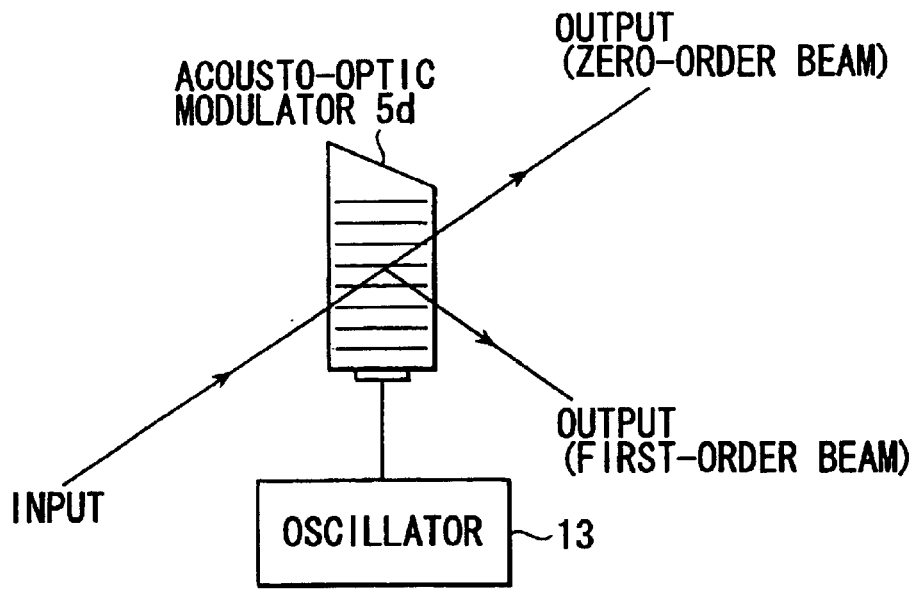
FIG. 30 shows an acousto-optic modulator that uses first-order diffraction to effect frequency modulation.
Figure 30B:
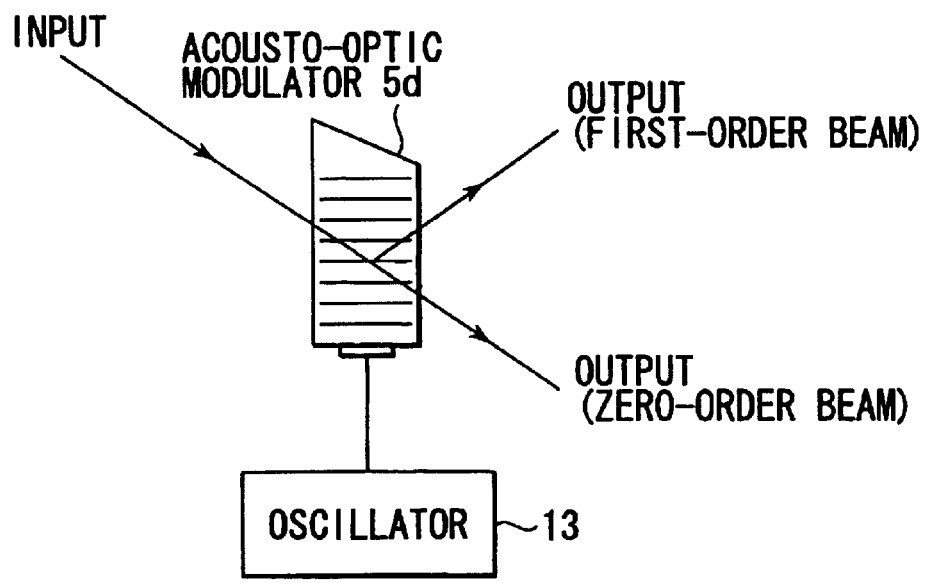

The apparatus described above uses an optical phase modulator. However, intensity modulation can be used instead of phase modulation, since the same type of sidebands can be, obtained with intensity modulation. It is also possible to use frequency modulation. For example, it is possible to use the acousto-optic modulators $5d$ (which are acousto-optic frequency shifters) shown in FIG. 30 that utilize first-order diffraction. In such a case, in output light, the same type of fringes can be observed by scanning the frequencies of electrical signals to the acousto-optic modulators $5d$. Similarly, when the wavelength of the light is changed, fringes undergo a shift caused by the group velocity dispersion of the fiber. If denoted by L is the length of the fiber, $f_o$ is the frequency of signals applied to the shifter, and $\Delta f_o$ is the amount by which the fringe is shifted on the frequency axis for the minute wavelength change $\Delta L$, the relation of equation 14 can be used to obtain the group velocity dispersion.

An optical distributor was used that distributed the optical intensity equally to the terminals 3 and 4, that is, at a 1:1 ratio, which is the optimum for the apparatus of this invention. This method can still be applied even with a configuration that uses a different distribution ratio, as long as the above fringes can be observed.

Figure 4:
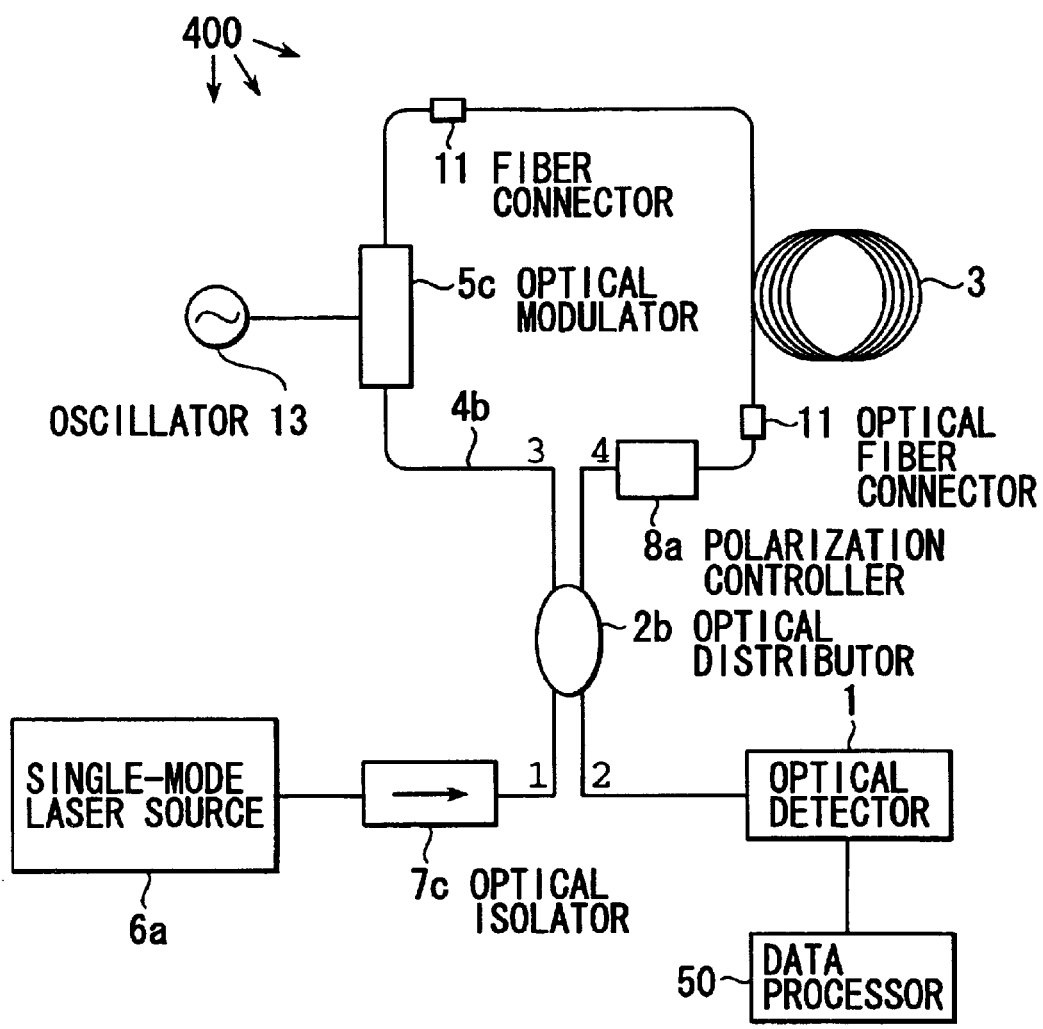
FIG. 4 is a diagram for explaining a second embodiment of the optical dispersion measurement apparatus of this invention.

A second embodiment of the optical dispersion measurement apparatus of the invention will now be described with reference to FIG. 4. This optical dispersion measurement apparatus 400 includes a wavelength-tunable single-mode laser 6a used as the optical source, a polarization-maintaining optical isolator 7c to prevent light being reflected back to the laser, a polarization controller 8a for adjusting the optical polarization, a four-terminal, polarization-maintaining optical distributor 2b for distributing the light, a phase or intensity modulator 5e, an electrical oscillator 13 for generating modulation signals, a fiber connector 11, a ring-shaped optical path 4b, an optical fiber 3 to be measured, and an optical detector 1 for detecting output light from the optical dispersion measurement apparatus. One end of the test fiber 3 is optically coupled to the modulator 5c, and the other end thereof to the polarization controller 8a. The oscillator 13 is used to drive the modulator 5c. The optical source 6a, isolator 7c, optical distributor 2b and modulator 5c are linked by the ring-shaped optical path 4b. The polarization controller 8a can be provided between the modulator 5c and the test fiber 3 instead of between the terminal 4 of the optical distributor 2b and the test fiber 3.

The configuration of the second embodiment differs from that of the first embodiment in that it uses a polarization-maintaining optical distributor 2b, a single polarization controller 8a, and a ring-shaped optical path 4b. Thus, it enables the number of polarization controllers to be reduced.

Figure 5:
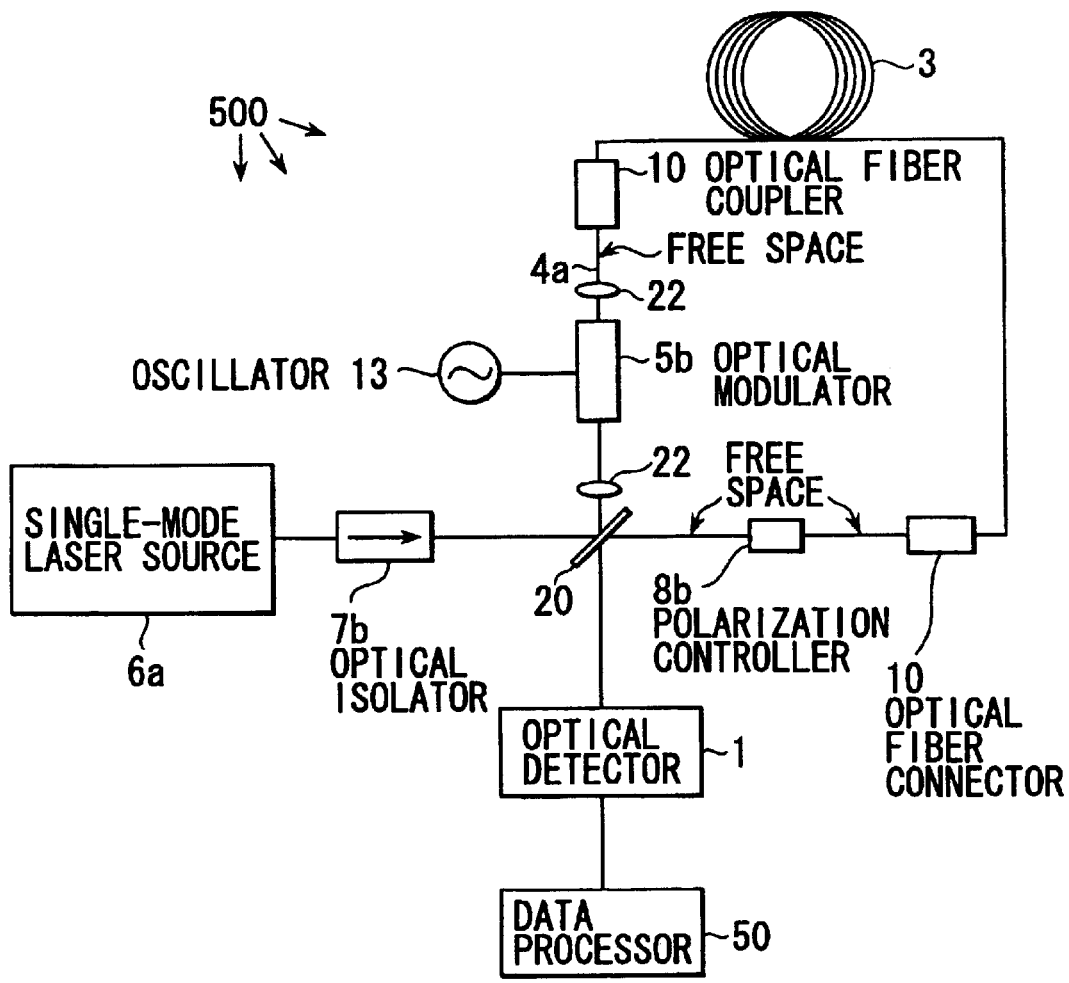
FIG. 5 is a diagram for explaining a third embodiment of the optical dispersion measurement apparatus of this invention.

A third embodiment of the optical dispersion measurement apparatus will now be described with reference to FIG. 5. This optical dispersion measurement apparatus 500 includes a wavelength-tunable single-mode laser 6a used as the optical source, a bulk type optical isolator 7b to prevent light being reflected back to the laser, a bulk type polarization controller 8b for adjusting the optical polarization, a beam-splitter 20 for dividing the laser beam into two components, a bulk type phase or intensity modulator 5b, an electrical oscillator 13 for generating modulation signals, an optical fiber 3 that is to be measured, and an optical detector 1 for detecting output light from the optical dispersion measurement apparatus. A ring-shaped optical path 4a that links the optical source 6a, isolator 7b, beam-splitter 20, modulator 5b and polarization controller 8b is located in air. Clockwise light emitted by the modulator 5b is guided into the optical fiber 3 by means of a fiber coupler 10. The fiber coupler 10 is also used to guide counterclockwise light from the polarization controller 8b into the optical fiber 3. The polarization controller 8b can be provided between the modulator 5b and the test fiber 3 instead of between the beam-splitter 20 and the test fiber 3.

This apparatus according to the third embodiment is characterized by the optical path 4a being provided in air, making it possible to virtually ignore the dispersion characteristic of that portion.

Figure 6:
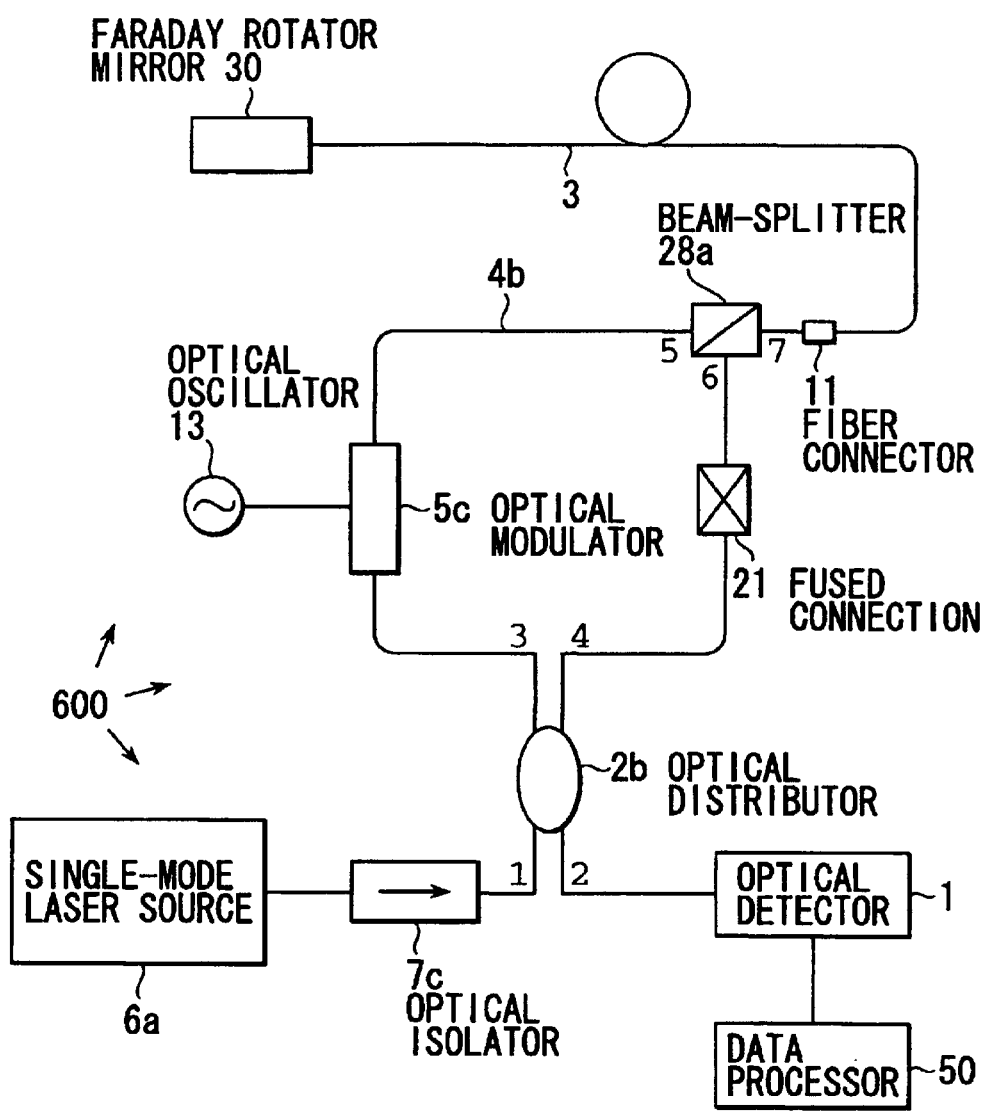
FIG. 6 is a diagram for explaining a fourth embodiment of the optical dispersion measurement apparatus of this invention.

In the measurement apparatuses of the first three embodiments, the ends of the fiber to be measured have to be brought to the measuring instrument. However, in the case of optical fiber that is already laid, it is often possible to connect up only one end. In the case of the above-described apparatuses, this would make it difficult to conduct measurements. The fourth embodiment of the invention, shown in FIG. 6, presents one way of resolving this difficulty. As shown, this provides a Faraday rotator mirror at one end of the object being measured, so for measurements, it is only necessary to connect one end to the measuring apparatus.

The optical dispersion measurement apparatus 600 shown in FIG. 6 uses a wavelength-tunable single-mode laser 6a, a polarization-maintaining isolator 7c, a polarization-maintaining optical distributor 2b and a polarization-maintaining modulator 5c. A polarization-maintaining optical fiber 4b is used to connect these, with the principal optical axis in alignment. The optical modulator 5c is connected to a first-optical fiber terminal 5 of a polarization plane beam-splitter 28a, with the principal optical axis in alignment. The terminal 4 of the optical distributor 2b and a second optical fiber terminal 6 of the beam-splitter 28a are connected with the principal optical axis rotated 90 degrees, using a splice 21. A third fiber terminal 7 of the beam-splitter 28a was optically connected to the test fiber 3 by the fiber connector 11. The other end of the test fiber 3 was optically connected with the Faraday rotator mirror 30. In accordance with this setup, the clockwise and counterclockwise light components distributed by the optical distributor 2b are both circulated through the test fiber 3 by the beam-splitter 28a and returned to the terminals 4 and 3 of the distributor 2b. While the clockwise component is circulated through the test fiber 3 after being modulated, the counterclockwise component is modulated after being circulated through the test fiber 3. Therefore, if L is the length of the test fiber 3, the length of the optical path of the fiber becomes substantially 2L. Provided the length L is sufficiently longer than the ring 4b and its appurtenant parts, the group velocity dispersion can be shown by equation 33. The modulator 5c can be provided between the terminal 4 of the optical distributor 2b and the 90-degree splice 21 instead of between the terminal 3 of the distributor 2b and the beam-splitter 28a. In that case, the counterclockwise component would be modulated before the modulation of the clockwise component.

With the configuration of FIG. 6, light output from the second terminal of the polarization-maintaining optical distributor 2b that is not modulated by the modulator 5c is subject only to optical path loss, so it exhibits fringes when modulated. If the 90-degree splice 21 is replaced by the optical path shown in FIG. 12, when the light is not modulated by the modulator 5c, it becomes possible to switch the optical output from the second terminal of optical distributor 2b from a relatively high output to a relatively low output, or vice-versa.

Figure 12A:
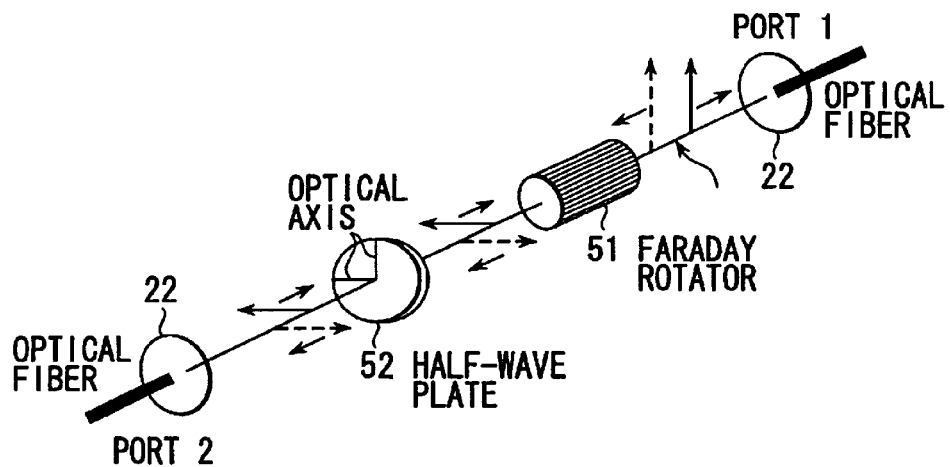
FIG. 12 shows a configuration whereby the optical output from the second terminal of a polarization-maintaining optical distributor is switched from a relatively large output to a relatively small output and vice-versa, when the light has not been modulated by the modulator shown in FIG. 6, FIG. 12(a) showing a half-wave plate rotated to one end and FIG. 12(b) showing the half-wave plate rotated to the other end.

As shown in FIG. 12(a), when the optical axis of a half-wave plate 52 is parallel or perpendicular to the polarization, the half-wave plate has no effect. However, since the clockwise and counterclockwise light components are both rotated 90 degrees in the same direction by the Faraday rotator 51, both components can pass through the ring and be output from the second terminal of the polarization-maintaining optical distributor 2b. When light has not been modulated by the modulator 5c, light output from the second terminal of the distributor 2b can be switched from a relative maximum to a relative minimum. Using this means makes it possible to remove DC components from detection signals, preventing saturation of the detector by the DC components.

Figure 12B:
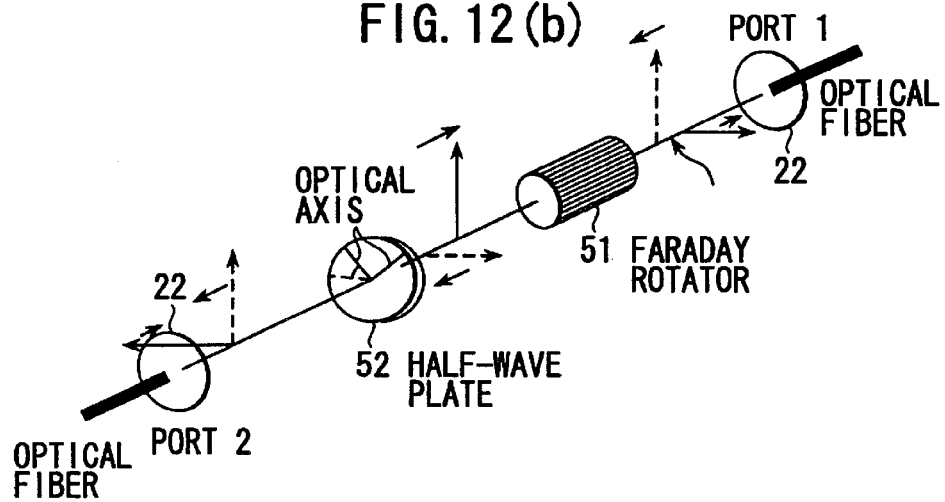

When the optical axis of the half-wave plate 52 is at 45 degrees to the polarization, as in FIG. 12(b), the half-wave plate rotates the polarization 90 degrees. In this case, the lateral polarization of counterclockwise (CCW) light entering via a port-2 of FIG. 12(b) is rotated twice, by the half-wave plate and by the Faraday rotator mirror and becomes extinct by the plane of polarization beam-splitter 28a. However, after passing through the Faraday rotator mirror and the half-wave plate 52, the clockwise (CW) light incident via a port-1 of FIG. 12(b) regains its vertically polarization and is output from the second terminal of the distributor 2b. Since there is now no CCW component, and therefore no interference, the CW component is output at a constant intensity that is not changed even by modulation. Thus, rotating the half-wave plate makes it readily possible for light not modulated by the modulator 5c that is output from the second terminal of the optical distributor 2b to be switched from a relatively high output to a relatively low output, and vice-versa. With this apparatus, any defects in the optical path can be quickly found, and there is no loss of optical detection sensitivity.

Figure 7:
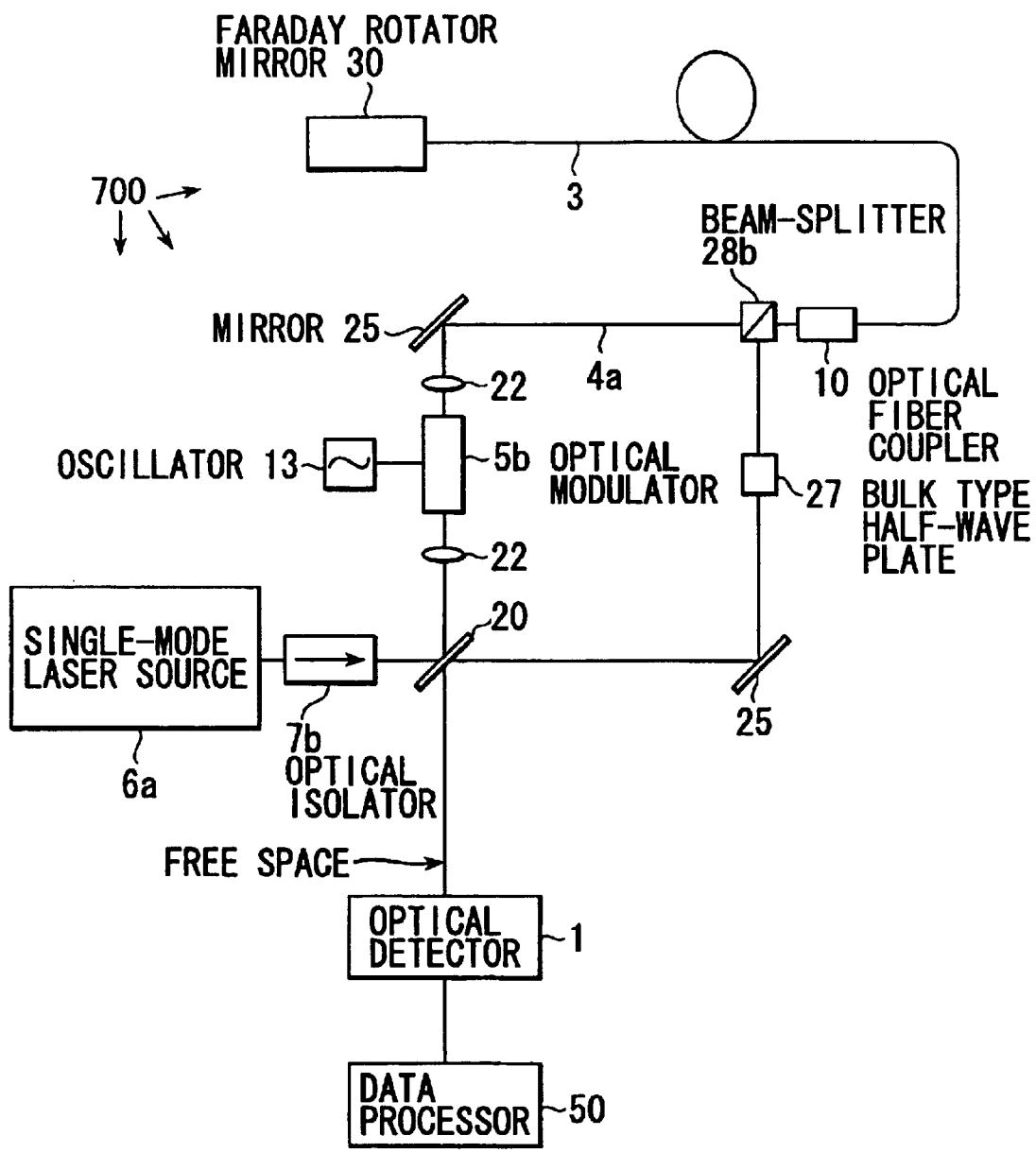
FIG. 7 is a diagram for explaining a fifth embodiment of the optical dispersion measurement apparatus of this invention.

A fifth embodiment of the optical dispersion measurement apparatus will now be described with reference to FIG. 7. This optical dispersion measurement apparatus 700, which is similar to the fourth embodiment, is characterized by its use of a bulk type phase or intensity modulator 5b where the entry and exit of light is made through free space, and by the fact that part of the optical path is in air. The apparatus 700 is also characterized by its use of a bulk type isolator 7b, bulk type optical modulator 5b, bulk type beam-splitter 20 and bulk type plane of polarization beam-splitter 28b. The optical path 4a connecting these elements is disposed in air. A bulk typ⁻ half-wave plate 27 is used to realize the same effect provided by the 90-degree splice in FIG. 6. An optical fiber coupler 10 is used to introduce light from the polarization beam-splitter 28b to the test fiber 3. The modulator 5b can also be located between the beam-splitter 20 and the half-wave plate 27, in which case the counterclockwise light component will be modulated before the modulation of the clockwise light component. A merit of the configuration of this apparatus 700 is that the air-located optical path 4a exhibits negligible dispersion in optical wavelength regions used in optical fiber based communications.

The apparatus of this embodiment was configured to measure group velocity dispersion, but virtually the same measurement method can be used to measure the optical fiber length or to measure the distance to an object. An embodiment using this measuring method is described below.

Figure 8:
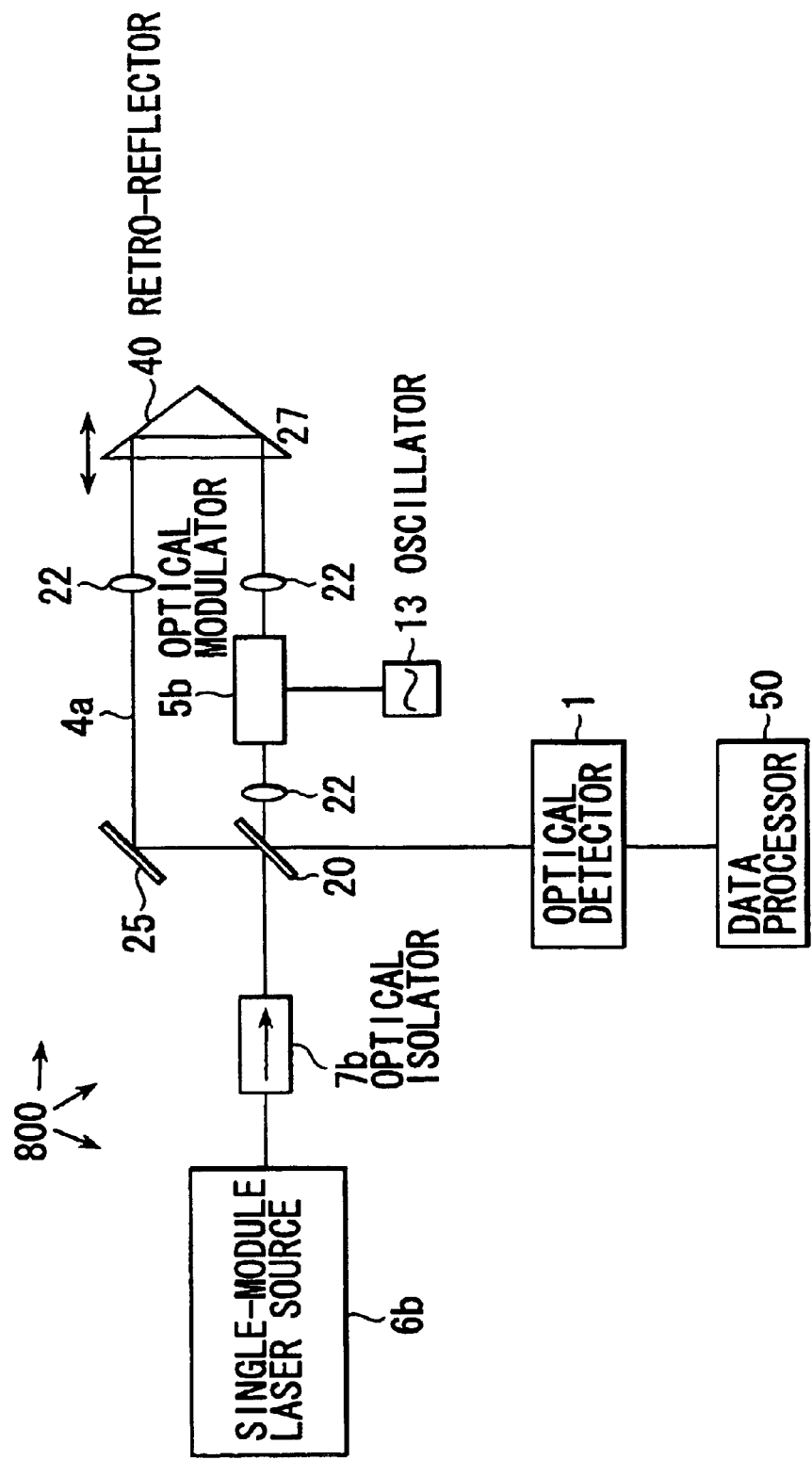
FIG. 8 is a diagram for explaining a sixth embodiment of the optical dispersion measurement apparatus of this invention.

FIG. 8 shows an optical dispersion measurement apparatus 800 for measuring distances according to a sixth embodiment of the invention. The apparatus 800 includes a single-mode laser source 6b, a bulk type optical isolator 7b to prevent light being reflected back to the laser, a beam-splitter 20 for dividing a source beam into two components, a bulk type phase or intensity modulator 5b, a retro-reflector 40 and an optical detector 1 for detecting light output by the optical dispersion measurement apparatus. An optical path 4a linking the optical source 6b, isolator 7b, beam-splitter 20, modulator 5b and polarization controller 8b is located in air. The apparatus 800 is a ring interferometer in which the clockwise and counterclockwise component light beams are conveyed in parallel to the object where they are reflected by the retro-reflector 40 positioned at the object. The distance L to the object can be found as follows. Provided the distance L is sufficiently greater than the length of the ring interferometer with other parts, L can be obtained by the following equation, in which C is the velocity of light in air.

$$L = \frac{1}{2\beta_1 f_C} = \frac{C}{2 f_C} \quad (47)$$

Therefore, l. can be measured by obtaining the fringe period $f_c$ from interference fringes obtained by scanning the modulation frequency.

Figure 9:
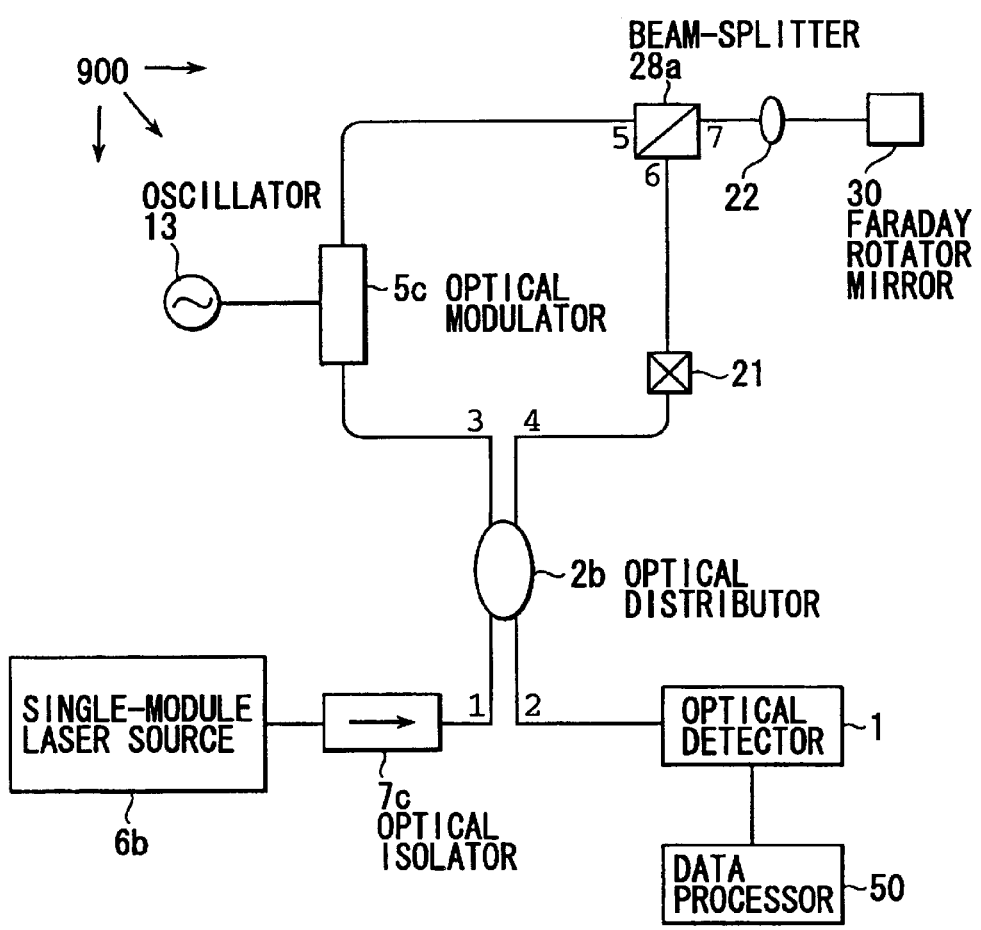
FIG. 9 is a diagram for explaining a seventh embodiment of the optical dispersion measurement apparatus of this invention.

FIG. 9 shows an optical dispersion measurement apparatus 900 for measuring distances according to a seventh embodiment of the invention. The apparatus 900 uses a single-mode laser 6b as the optical source, a polarization-maintaining optical isolator 7c to prevent light being reflected back to the laser, a polarization-maintaining optical distributor 2b and a polarization-maintaining phase or intensity modulator 5c. A polarization-maintaining optical fiber 4b is used to connect these, with the principal optical axis in alignment. An optical modulator 5c is connected to a first optical fiber terminal 5 of a polarization plane beam-splitter 28a, with the principal optical axis in alignment. The terminal 4 of the optical distributor 2b and a second optical fiber terminal 6 of the beam-splitter 28a are connected with the principal optical axis rotated 90 degrees, using a splice 21. A lens 22 is used to collimate the light beams travelling from a third fiber terminal 7 of the beam-splitter 28a to the object, where they are reflected back to the lens 22 by a Faraday rotator mirror 30 positioned at the object. In accordance with this configuration, the clockwise and counter-clockwise component beams from the distributor 2b are reciprocated once to and from the object by the polarization beam-splitter 28, and are returned to the terminals 3 and 4 of the distributor 2b. Provided that the distance L to the object is sufficiently greater than the length of the ring interferometer and its appurtenant parts, L can be found from equation 47. The modulator 5c can be provided between the terminal 4 of the distributor 2b and the 90-degree splice 21 instead of between the distributor terminal 3 and the beam-splitter 28a, in which case the counterclockwise component will be modulated before the modulation of the clockwise component. The advantage of this configuration is that there is no intermingling between the components travelling clockwise and counterclockwise, which, compared to the sixth embodiment, makes it easier to obtain interference fringes.

Figure 10:
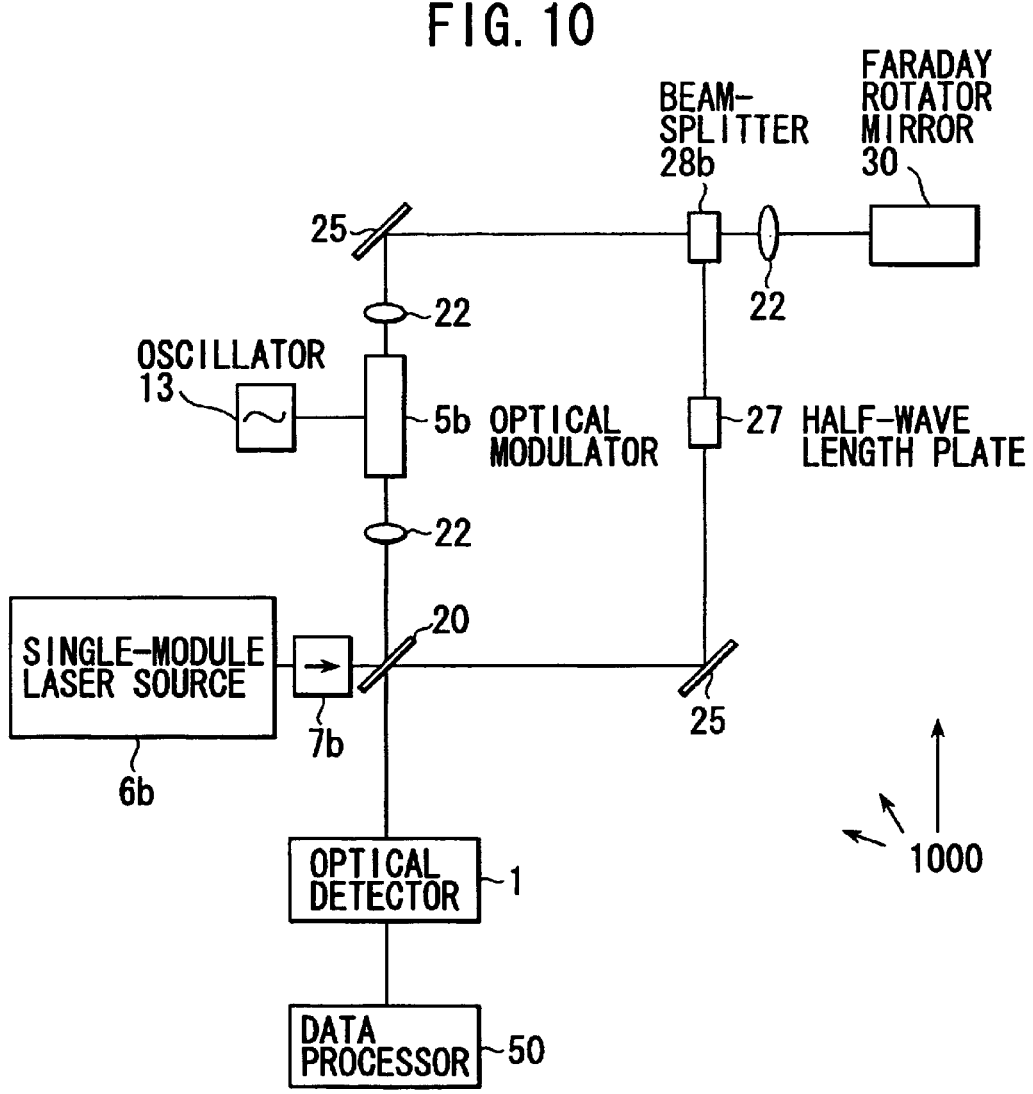
FIG. 10 is a diagram for explaining an eighth embodiment of the optical dispersion measurement apparatus of this invention.

FIG. 10 shows an optical dispersion measurement apparatus 1000 for measuring distances according to an eighth embodiment of the invention. The apparatus 1000 uses a bulk type isolator 7b, a bulk type optical modulator 5b, a bulk type beam-splitter 20 and a bulk type plane of polarization beam-splitter 28b. The optical path 4a that connects these elements is disposed in air. A bulk type half-wave plate 27 is used to realize the same effect provided by the 90-degree splice in FIG. 6. A lens 22 is used to collimate the light beams travelling from the third terminal 7 of the beam-splitter 28a to the object, where they are reflected back to the apparatus by a Faraday rotator mirror 30 positioned at the object. Provided that the distance L to the object is sufficiently greater than the length of the ring interferometer constituted by the apparatus 1000 and its appurtenant parts, L can be found using equation 47. The modulator 5b can instead be provided between the beam-splitter 20 and the half-wave plate 27, in which case a counterclockwise component is modulated before the modulation of a clockwise component. As in the case of the seventh embodiment, the advantage of this configuration is that there is no intermingling between the components travelling clockwise and counterclockwise, which, compared to the sixth embodiment, makes it easier to obtain interference fringes.

Next, a method of measuring changes in distance will be described, as the ninth embodiment of the invention. Based on equation 47, changes in distance can be represented as follows.

$$\Delta L = -\frac{N}{2f_0^2 \beta_1} \quad \Delta f_0 = -\frac{1}{2f_0 \beta_1}\left(\frac{\Delta f_0}{fc}\right) \quad (48)$$

In air, substantially $\beta_1 = 1/C$, and $\Delta L$ can be made very small by modulating with a large N value, that is, at a very high frequency. For example, since $\Delta f_c/f_c = 1/100$ is easy to detect, phase modulating at 3 gigahertz enables a $\Delta L$ of 0.5 mm to be detected. The size of $\Delta L$ that can be detected decreases in inverse proportion to the modulation frequency. The merit of this method is that the size of $\Delta L$ that can be detected does not depend on how large L is. In principle, therefore, measurement precision increases with distance. With respect to a distance of 10 km, for example, the precision will be $5 \times 10^{-8}$. It is also easy to improve the measurement precision of this invention by making measurement at a plurality of modulation frequencies and combining the results.

Next, a tenth embodiment will be described with reference to the optical dispersion measurement apparatus shown in FIG. 18. This apparatus includes a wavelength-tunable single-mode laser 6a, a polarization-maintaining circulator 15 constituting the I/O means, a polarization-maintaining phase or intensity modulator 5c, a test fiber 3, a Faraday rotator mirror 30, a rotatable polarizer 9 and an optical detector 1. A light beam from the source laser is directed into a polarization-maintaining optical 4b with the plane of polarization of the beam aligned with the principal axis of the fiber. One end of the test fiber 3 is coupled to the modulator 5c and the other end thereof to the Faraday rotator mirror 30. By means of the circulator 15, light entering via port-1 exits from port-2 and enters the modulator. Light that exits from port-4 of the modulator enters port-2 of the circulator 15 and exits from port-3.

An electrical oscillator 13 is used to drive the modulator 5c. Between the circulator 15 and the modulator 5c, there is a 45-degree splice 23. This arrangement enables light entering the modulator 5c to be divided into two components of equal intensity, one being an X axis component that is modulated, and a Y axis component at right angles thereto, which is virtually unmodulated. The rotatable polarizer 9 is used to select output H or V components. Data is processed by a data processor 50.

Next, an eleventh embodiment will be explained with reference to the measurement apparatus using a linear interferometer shown in FIG. 19. Instead of a circulator, this apparatus uses a polarization splitter 28a. Horizontally polarized light H enters via port-1, and vertically polarized components V are extracted via port-3. This eliminates the need for the polarizer 9 used in the configuration of FIG. 18. The mean optical output from port-3 corresponds to $<E_V(t)*E_V(t)>$ of equation 29 or $P_V$ of equation 37.

Figure 18:
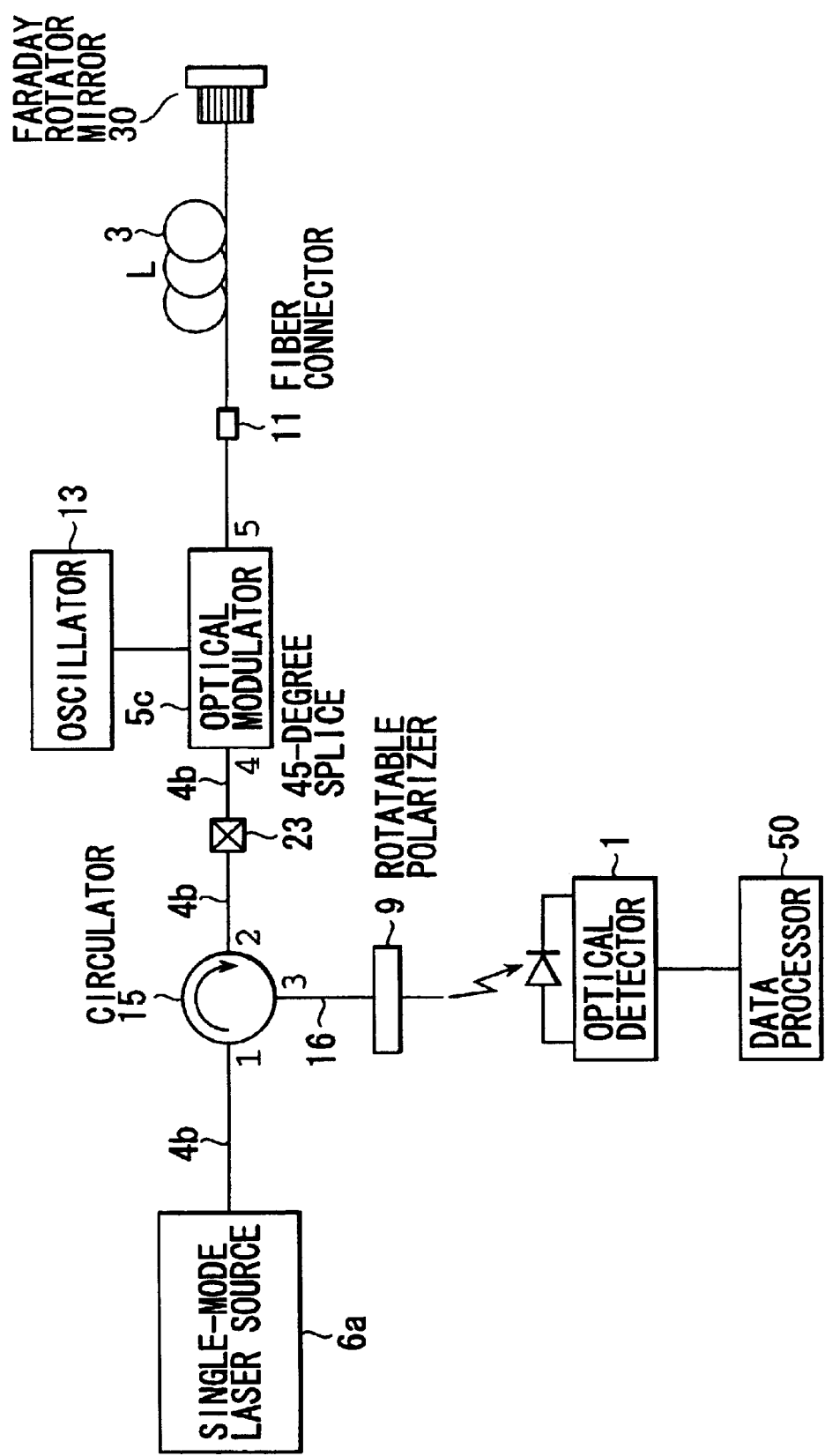
FIG. 18 is a block diagram for explaining a tenth embodiment of the optical dispersion measurement apparatus of the present invention.
Figure 19:
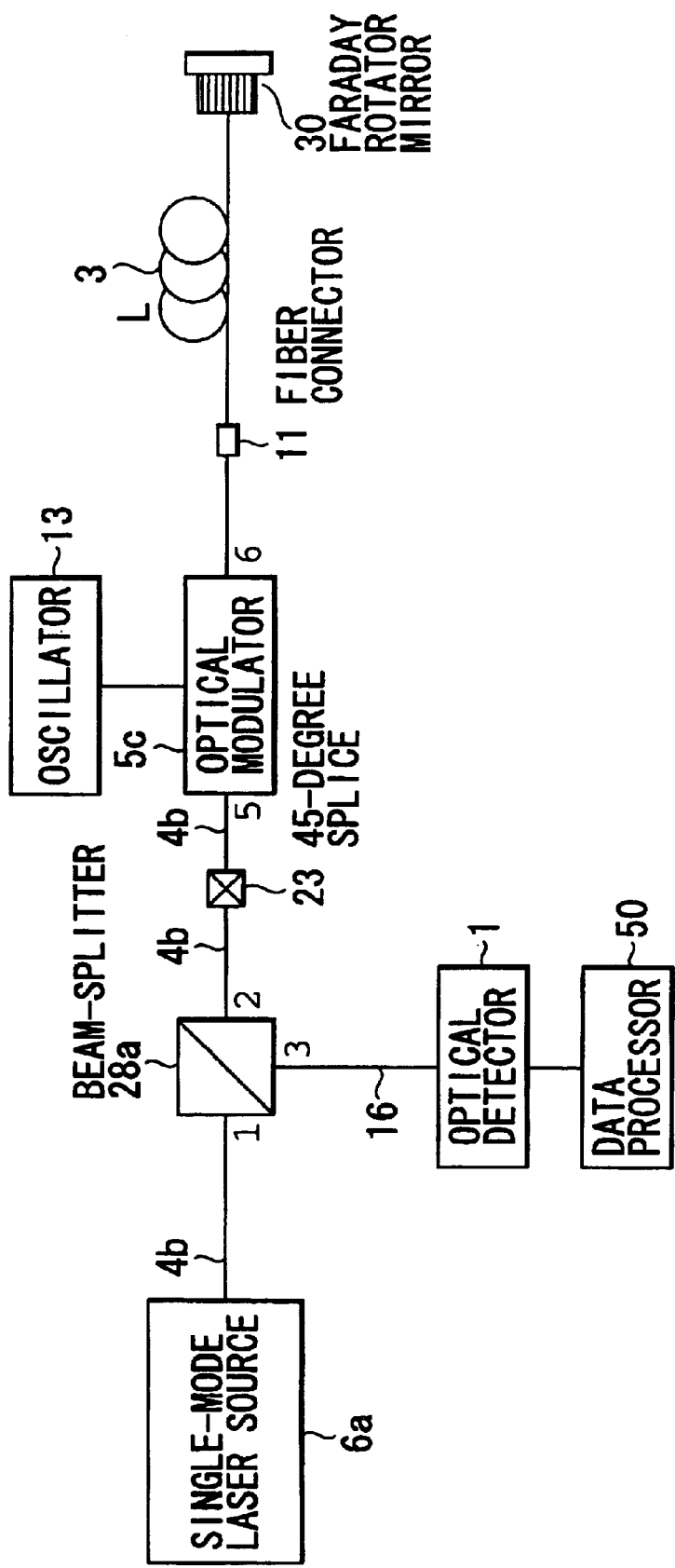
FIG. 19 is a block diagram for explaining an eleventh embodiment of the optical dispersion measurement apparatus of the invention.
Figure 20:
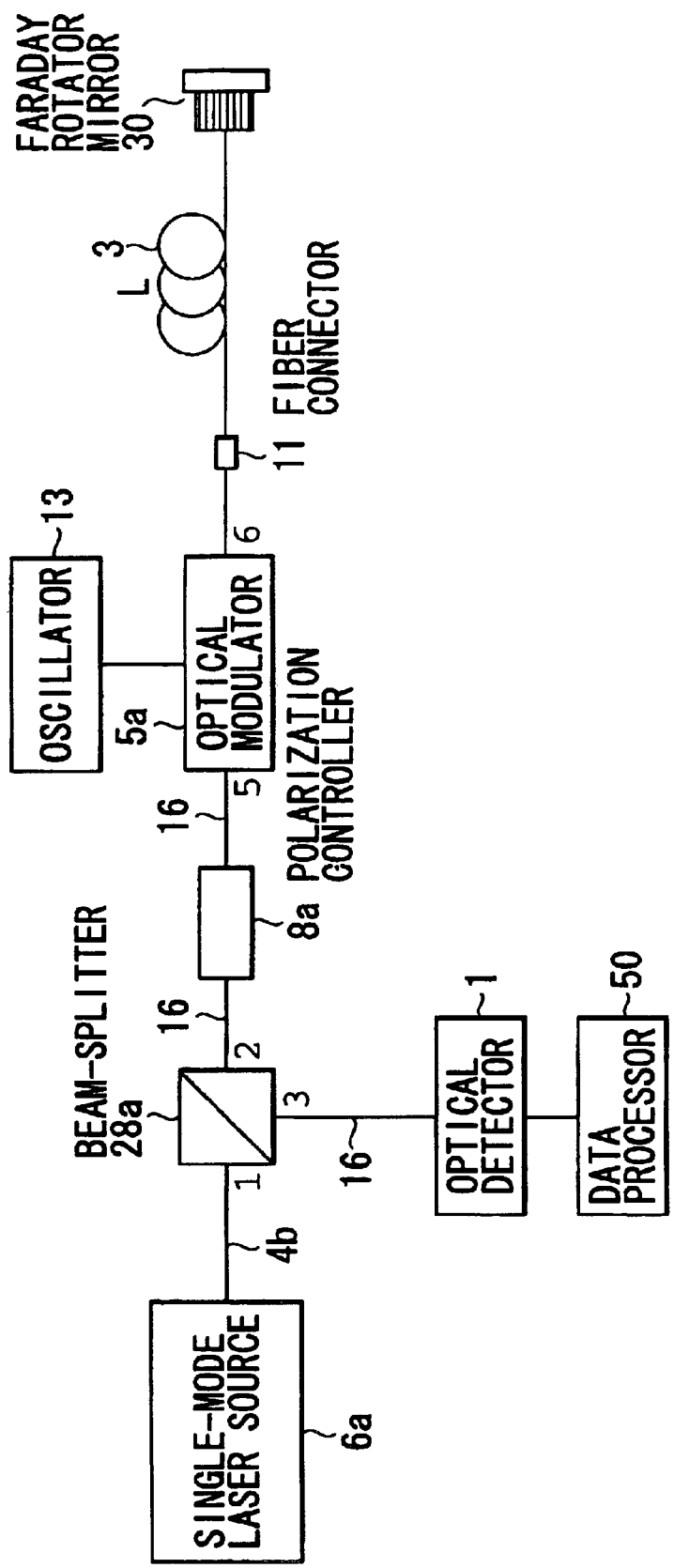
FIG. 20 is a block diagram showing a polarization controller used in the apparatus of FIG. 19 as means for adjusting the polarization of light incident on the optical modulator.
Figure 21:
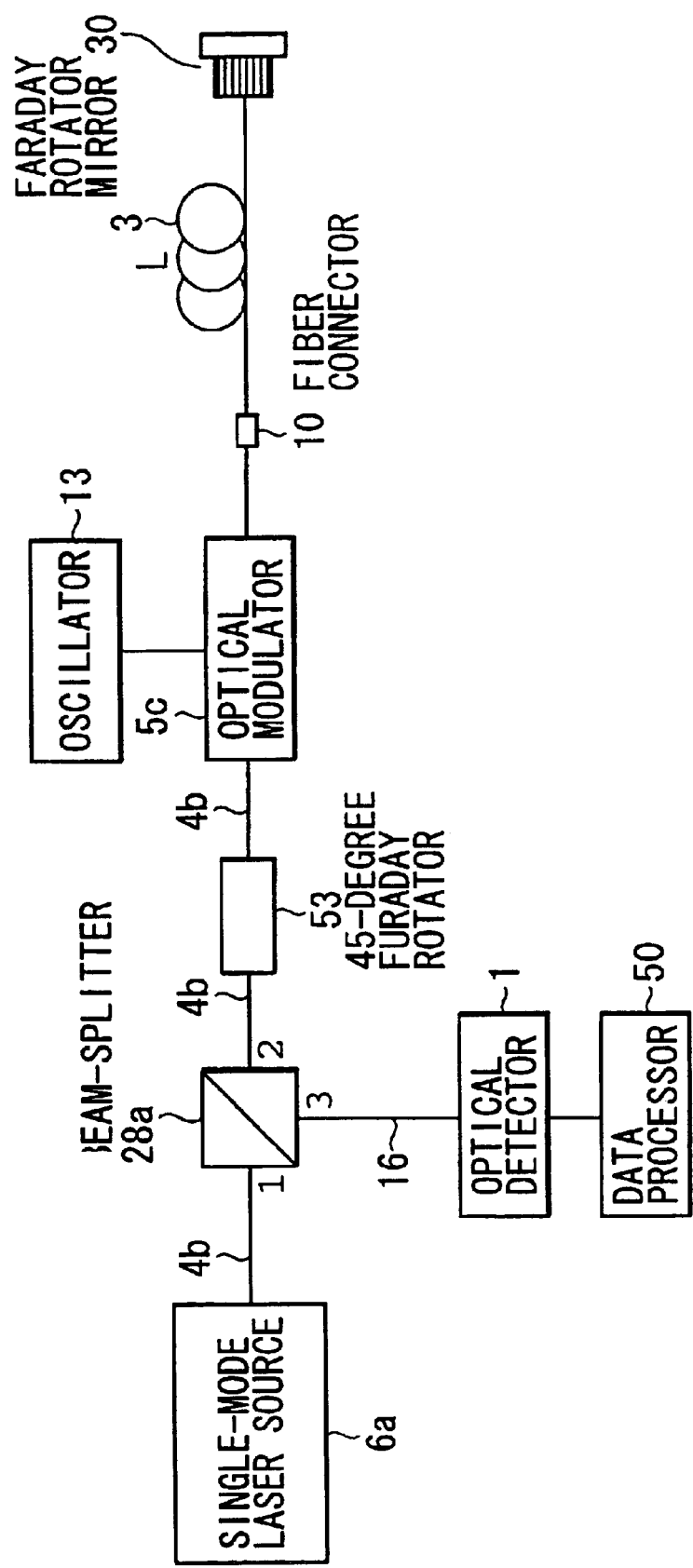
FIG. 21 is a block diagram showing a 45-degree Faraday rotator mirror provided as the means for adjusting the polarization of the light falling incident on the optical modulator.

The polarization of light incident on the modulator 5c can be adjusted by using the 45-degree splice of FIG. 18 on the polarization-maintaining fiber 4b, or the polarization controller 8a shown in FIG. 20, or the 45-degree Faraday rotator mirror 53 shown in FIG. 21. If the 45-degree Faraday rotator mirror 53 is used, the light component-1 and light component-2 will be rotated by further 90 degrees by their passage through the optical fiber, so the mean optical output will be equivalent to $<E_H(t)*E_H(t)>$ of equation 28 or $P_H$ of equation 36.

Figure 22:
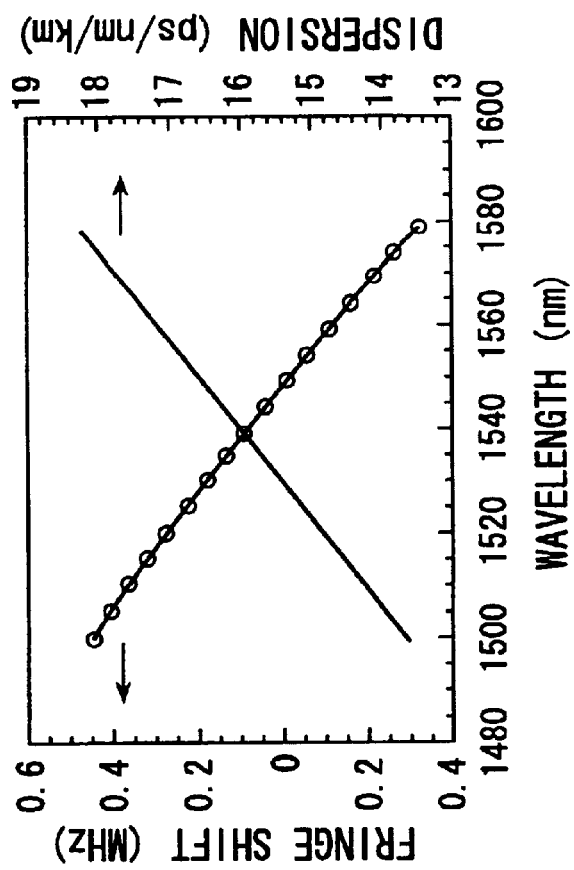
FIG. 22 shows an example of fiber dispersion measurement using the apparatus of FIG. 20, FIG. 22(a) showing fringes obtained at wavelengths of 1545 nm, 1550 nm and 1555 nm, and FIG. 22(b) showing fringe shift at other wavelengths relative to the 1550 nm fringe, and changes in dispersion relative to wavelength.
Figure 22:
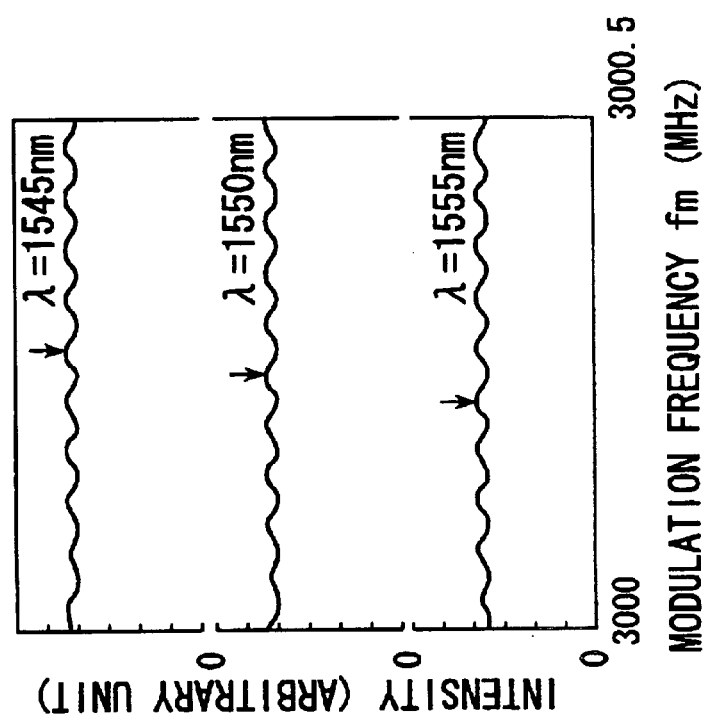

FIGS. 22(a) and 22(b) show examples of fiber dispersion measurements conducted using the configuration of FIG. 20. Modulation was performed at around 3.0 gigahertz using a 20-gigahertz phase modulator made by Ramar Company. FIG. 22(a) shows fringes obtained at wavelengths of 1545 nm, 1550 nm and 1555 nm. A standard fiber 1.0 kilometer long was used. FIG. 22(b) shows fringe shift at other wavelengths relative to the 1550 nm fringe, and changes in dispersion relative to wavelength. FIG. 22(b) shows fiber dispersion plotted against wavelength, derived from equation 33.

Figure 23:
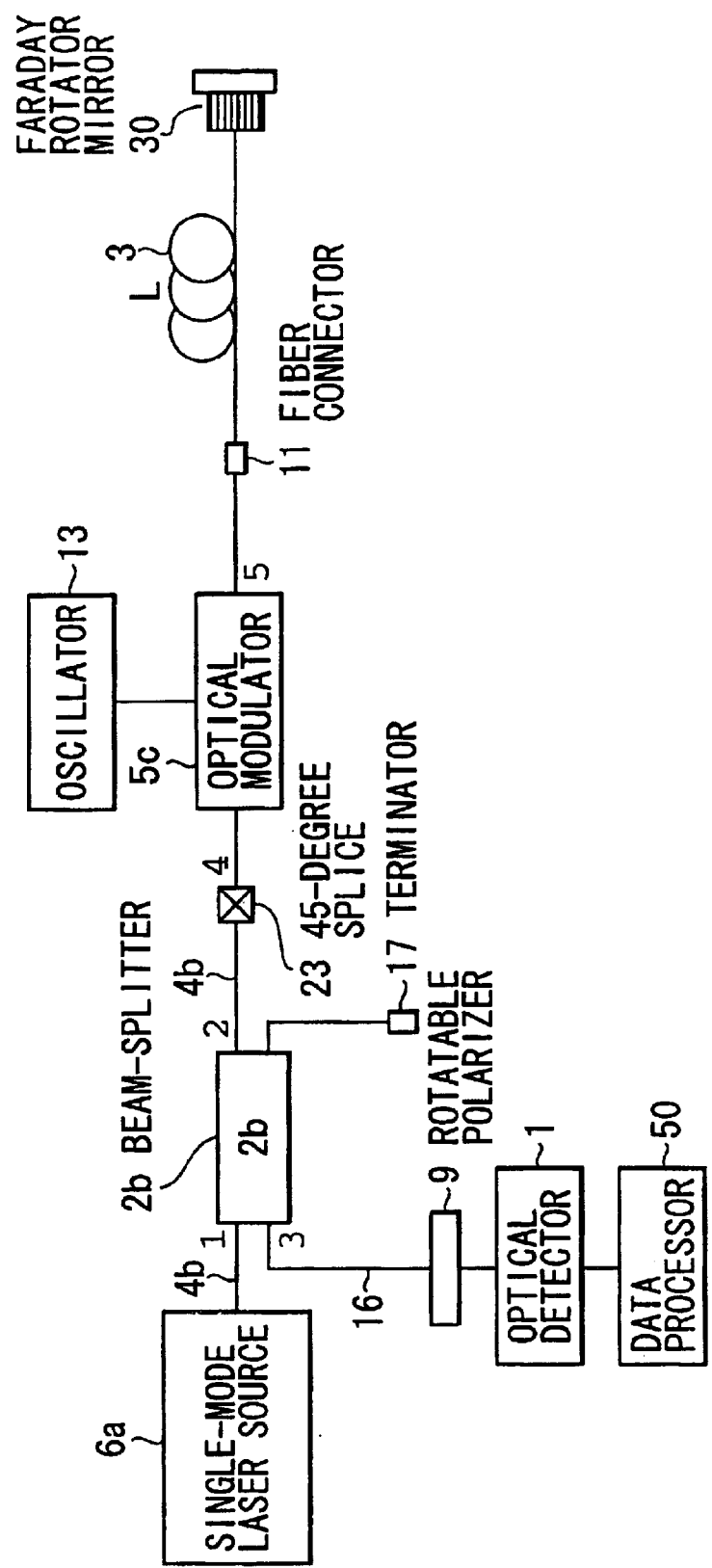
FIG. 23 is a block diagram for explaining a twelfth embodiment of the optical dispersion measurement apparatus according to the invention.

Next, a twelfth embodiment will be explained with reference to the measurement apparatus using a linear interferometer shown in FIG. 23. The optical distributor (3-dB coupler) 2b of FIG. 23 can be used as the optical I/O means of the interferometer. With this distributor 2b, light enters via a port-1 and exits from a port-2 to the modulator 5c. Light exiting a port-4 of the modulator 5c enters the port-2 of the distributor 2b and exits from a port-3. Compared to the tenth embodiment, the twelfth embodiment is characterized by the use of the optical distributor 2b. Light passing back and forth through the distributor 2b will suffer a total loss of 6 dB. However, the distributor 2b (3 dB coupler) is cheap, which enables manufacturing costs to be decreased. A rotatable polarizer 9 is used to select output H or V components.

Figure 24:
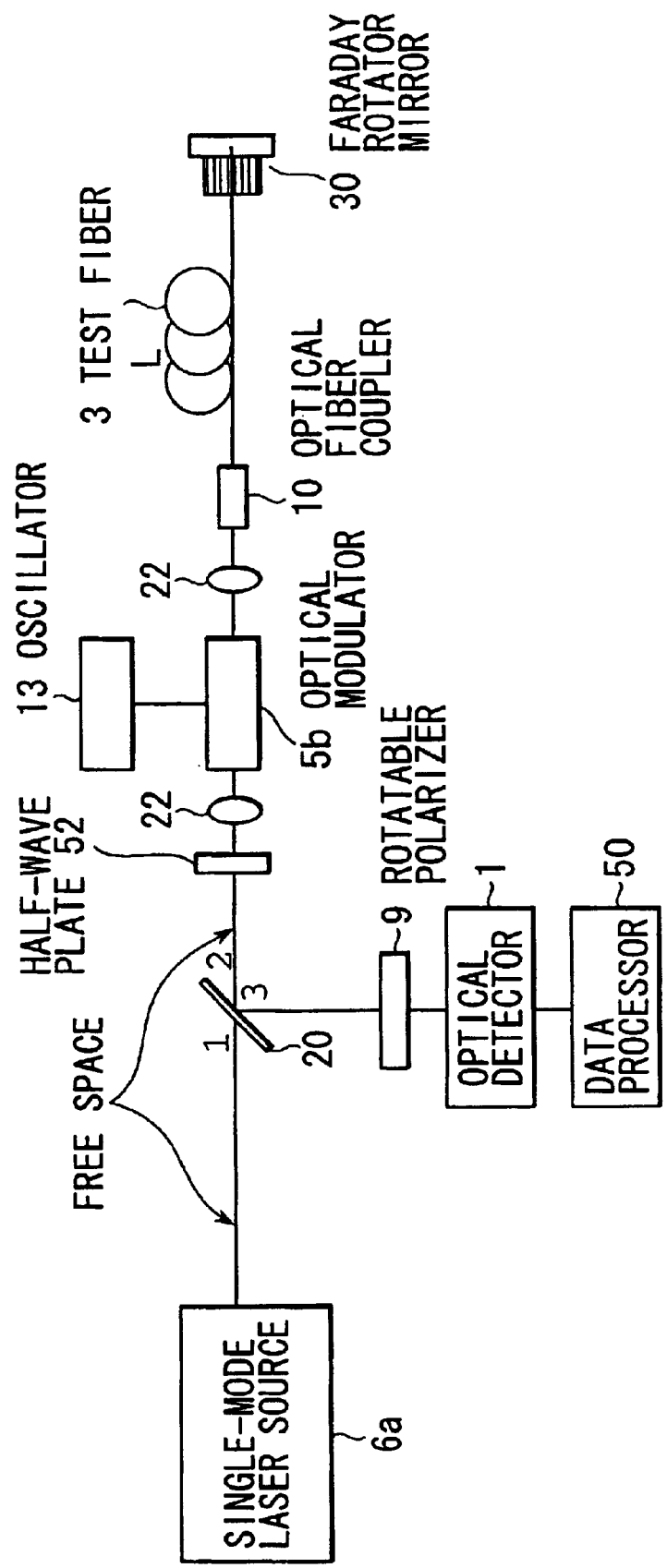
FIG. 24 is a block diagram for explaining a thirteenth embodiment of the optical dispersion measurement apparatus according to the invention.

FIG. 24 shows a measurement apparatus using a linear interferometer according to a thirteenth embodiment. This interferometer is characterized by its use of bulk component elements, particularly the I/O beam-splitter 20 and the half-wave plate 52 used to adjust the polarization of light entering the bulk type modulator 5b.

Figure 25:
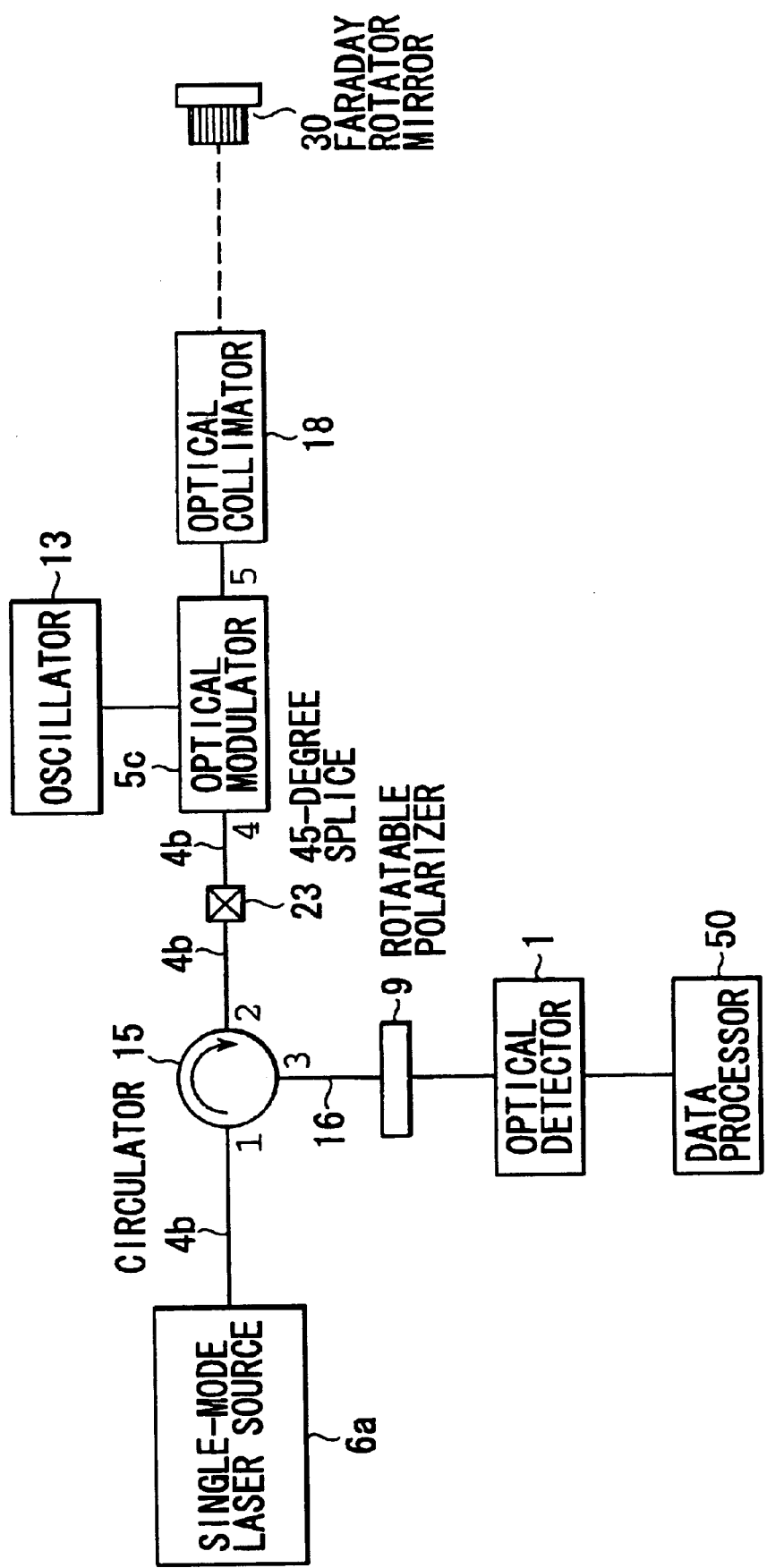
FIG. 25 is a block diagram for explaining a fourteenth embodiment of the optical dispersion measurement apparatus according to the invention.

As a fourteenth embodiment, FIG. 25 shows a measurement apparatus that uses a linear interferometer to measure the distance to a target object. Using a collimator 18, light exiting a port-5 of the modulator 5c is subjected to free-space propagation to an object. A Faraday rotator mirror 30 positioned at the object reflects the light back along the optical path to the port-5 of the modulator 5c. As in the case of the apparatuses shown in FIGS. 19, 20, 21, 23 and 24, this apparatus can be used to measure distances.

Figure 26:
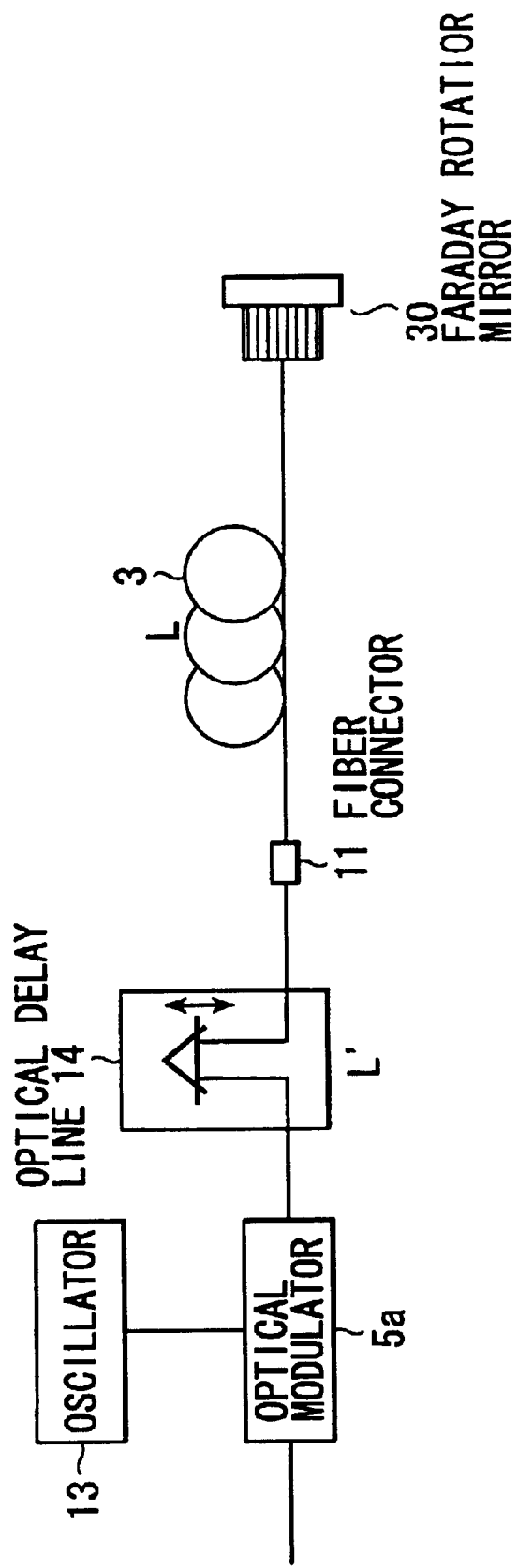
FIG. 26 is a block diagram for explaining a fifteenth embodiment.
Figure 27:
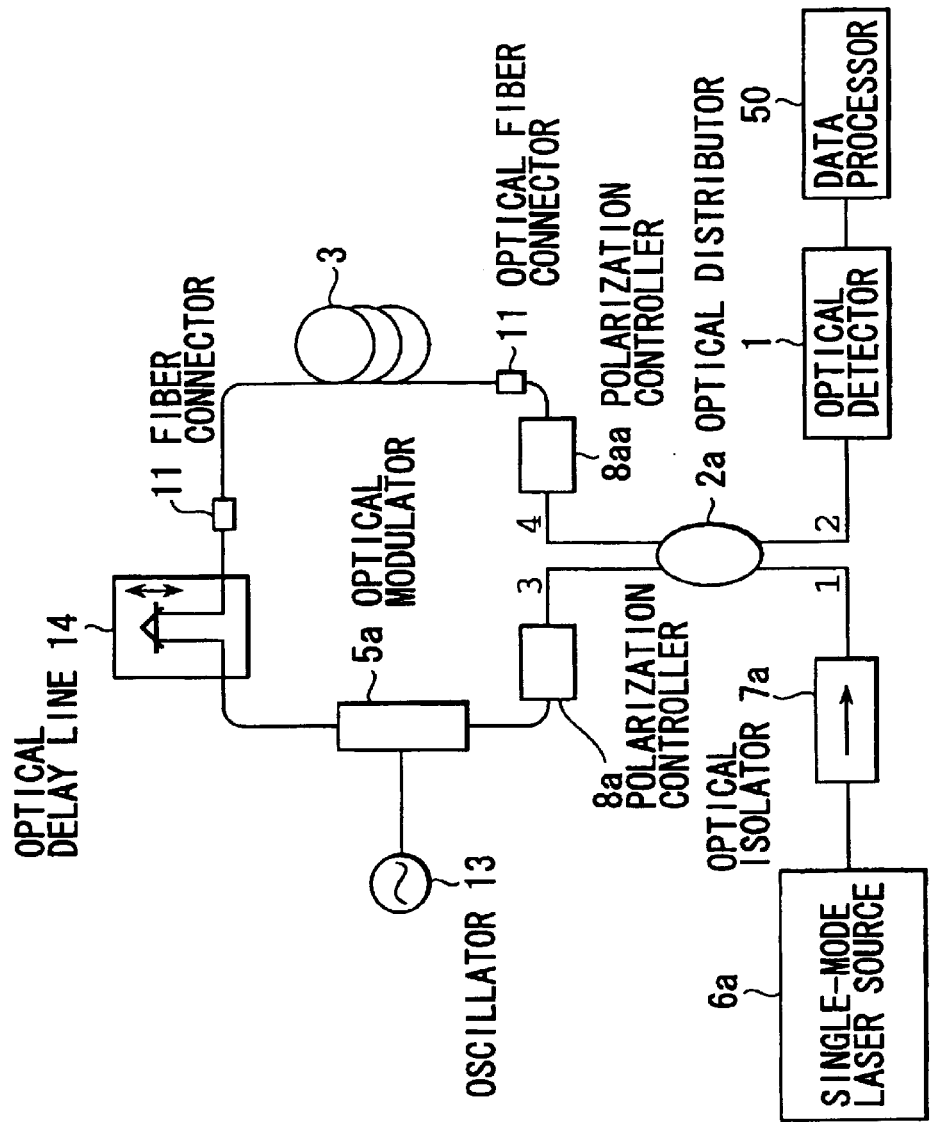
FIG. 27 is a block diagram showing a configuration for measuring optical characteristics of and distance to a measurement object while scanning the length of the optical path mechanically, in a ring type interferometer.
Figure 28:
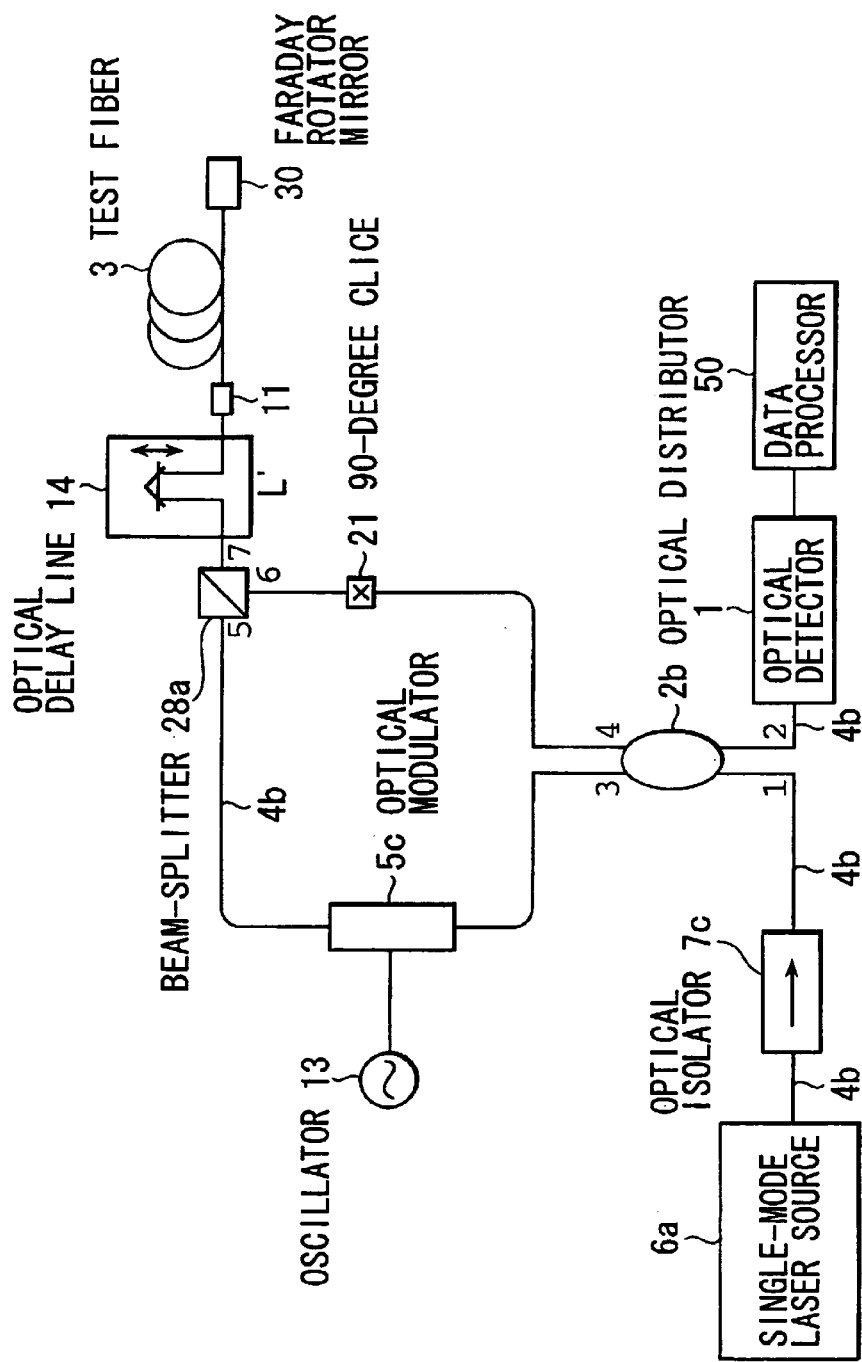
FIG. 28 is a block diagram showing another configuration for measuring optical characteristics of and distance to a measurement object while scanning the length of the optical path mechanically, in a ring type interferometer.

FIG. 26 shows a measurement apparatus forming a fifteenth embodiment, in which a linear interferometer is used to measure the distance to a target object. In accordance with this configuration, measurement is performed as the length of the optical path is being mechanically scanned. A variable delay line 14 provided between the modulator 5a and the Faraday rotator mirror 30 enables the length of the optical path to be changed. Measuring the optical properties of an object or the distance to the object while mechanically scanning the length of the optical path can also be done with the ring type interferometers described above, by adding a delay line to the ring, as shown in FIGS. 27 and 28.

Figure 29:
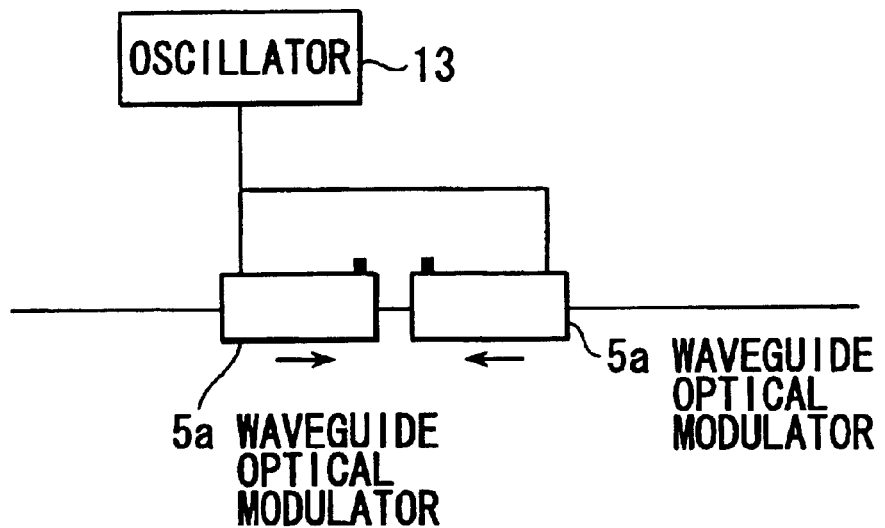
FIG. 29 is a block diagram showing optical modulation configurations for modulating light traveling in both directions along the optical path at high modulation frequencies in the order of several tens of gigahertz, FIG. 29(a) showing two modulators disposed in series with their directions of modulation in mutual opposition, and FIG. 29(b) showing the two modulators disposed in series with their directions of modulation oriented in opposite directions.
Figure 29:
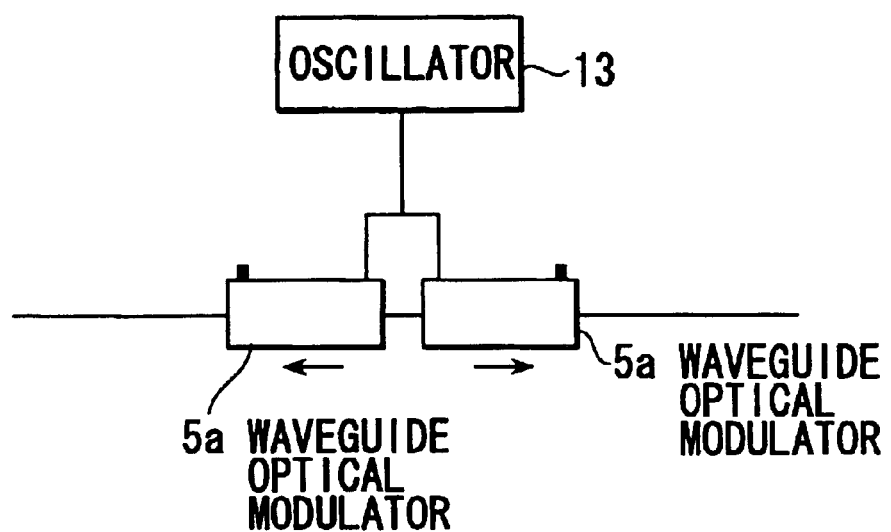

FIG. 29 shows optical modulator configurations for modulating light traveling in both directions along the optical path at high modulation frequencies in the order of several tens of gigahertz. In FIG. 29(a), two modulators are disposed in series with their directions of modulation in mutual opposition, and FIG. 29(b) shows the two modulators disposed in series with their directions of modulation oriented in opposite directions. By using modulators having the same characteristics and effecting the modulation using the same modulation signals, light components in both directions can be obtained that have the same modulation characteristics. To eliminate the dispersion effect of the fibers used to connect the two modulators, it is preferable to use short fibers. By using electro-optic materials, it would also be possible to incorporate the modulators in optical integrated circuits. Thus, using the inventive method described above makes it possible to measure distances and changes in distances with good precision, without using costly measurement apparatuses.

The effects of the invention are described below, based on the foregoing configurations.

The configuration for measuring the relation between detected light intensity and modulation frequency enables measurement of optical dispersion using an apparatus that is simpler than the prior art apparatus. By splitting the light into two components having a mutually orthogonal polarization-relationship, a straight path can be used to measure dispersion. Another aspect of the invention includes wavelength-tunable light generating means. Another aspect of the invention includes a configuration whereby dispersion is measured by varying the length of the optical path, making it cheaper to manufacture the apparatus.

Another aspect of the invention includes polarization control means, eliminating the need to use polarization-maintaining optical fiber for the optical path. In another aspect of the invention, measurement objects can be replaced. In another aspect of the invention, the interferometer, except for the measurement object portion, can be located in a gaseous atmosphere, or a reduced pressure atmosphere, making it possible to ignore dispersion in those portions. In another aspect of the invention, optical reflection means is provided at a measurement object, making it possible to measure distances. In another aspect of the invention, light output from a second terminal of an optical distributor can be selectively increased or decreased relative to light from the second terminal that has not been modulated. In another aspect of the invention, light components travelling in both directions can be given the same modulation characteristics. There are described methods of measuring correlations between detected light intensity and modulation frequencies, thereby making it possible to measure dispersion using a simpler apparatus than the prior art apparatus. In another aspect of the invention, the length of the optical path and changes in the length can be measured with high precision.

What is claimed is:

1. An optical dispersion measurement apparatus comprising:
   means for generating a light beam;
   means for inputting the generated light beam to a first terminal of an optical distributor;
   means for outputting the input light beam as a plurality of light beams;
   optical modulation means for modulating at least two of the plurality of light beams;
   an optical path via which the at least two modulated light beams are returned to the optical distributor and the at least two modulated light beams propagate in opposite directions along said optical path;
   means for outputting the at least two modulated light beams returned to the optical distributor from a second terminal of the optical distributor;
   means for detecting a time-averaged intensity of light output from the second terminal; and
   means for obtaining a dependency between the detected time-averaged intensity and an optical modulation frequency applied by said optical modulation means.

2. The apparatus according to claim 1, further comprising wavelength-tunable light beam-generating means for measuring said dependency for different wavelengths of a light beam generated.

3. The apparatus according to claim 2, wherein said optical modulation means includes at least one pair of optical modulators having mutually opposed forward modulation directions.

4. The apparatus according to claim 1, that further includes means for adjusting a length of the optical path used to return light output from the optical distributor back to the optical distributor.

5. The apparatus according to claim 4, wherein said optical modulation means includes at least one pair of optical modulators having mutually opposed forward modulation directions.

6. The apparatus according to claim 1, wherein the optical distributor has first to fourth terminals, and that further includes first polarization control means for adjustment of light traveling from the third terminal to the fourth terminal, and second polarization control means for adjustment of light traveling from the fourth terminal to the third terminal.

7. The apparatus according to claim 6, wherein said optical modulation means includes at least one pair of optical modulators having mutually opposed forward modulation directions.

8. The apparatus according to claim 1, wherein a measurement object is located on part of the optical path.

9. The apparatus according to claim 8, that further includes optical reflection means disposed at the measurement object.

10. The apparatus according to claim 9, wherein said optical modulation means includes at least one pair of optical modulators having mutually opposed forward modulation directions.

11. The apparatus according to claim 8, wherein said optical modulation means includes at least one pair of optical modulators having mutually opposed forward modulation directions.

12. The apparatus according to claim 1, wherein part of the optical path comprises optical reflection means.

13. The apparatus according to claim 12, wherein said optical modulation means includes at least one pair of optical modulators having mutually opposed forward modulation directions.

14. The apparatus according to claim 1, further comprising a half-wave plate provided on the optical path and a 90-degree Faraday rotator provided on the optical path configured to adjust a rotation of the half-wave plate, whereby an intensity of the light output from the second terminal of the optical distributor is increased when the light is not modulated compared to when the light is modulated, or is decreased when the light is not modulated compared to when the light is modulated.

15. The apparatus according to claim 14, wherein said optical modulation means includes at least one pair of optical modulators having mutually opposed forward modulation directions.

16. The apparatus according to claim 1, wherein said optical modulation means includes at least one pair of optical modulators having mutually opposed forward modulation directions.

17. An optical dispersion measurement apparatus comprising:
means for generating a light beam;
means for inputting the generated light beam to a first terminal of an optical distributor;
means for outputting the input light from a third terminal and a fourth terminal of the optical distributor;
light modulation means for modulating light traveling from the third terminal to the fourth terminal and light traveling from the fourth terminal to the third terminal;
means for outputting from a second terminal of the optical distributor modulated light traveling from the third terminal to the fourth terminal and from the fourth terminal to the third terminal;
means for detecting a time-averaged intensity of the light output from the second terminal; and
means for obtaining a dependency between the detected time-averaged intensity and an optical modulation frequency applied by said light modulation means.

18. The apparatus according to claim 17, further comprising wavelength-tunable light beam-generating means for measuring said dependency for different wavelengths of a light beam generated.

19. The apparatus according to claim 18, wherein said light modulation means includes at least one pair of optical modulators having mutually opposed forward modulation directions.

20. The apparatus according to claim 17, that further includes means for adjusting a length of an optical path used to return light output from the optical distributor back to the optical distributor.

21. The apparatus according to claim 20, wherein said light modulation means includes at least one pair of optical modulators having mutually opposed forward modulation directions.

22. The apparatus according to claim 17, further including first polarization control means for adjustment of light traveling from the third terminal to the fourth terminal, and second polarization control means for adjustment of light traveling from the fourth terminal to the third terminal.

23. The apparatus according to claim 22, wherein said light modulation means includes at least one pair of optical modulators having mutually opposed forward modulation directions.

24. The apparatus according to claim 17, wherein a measurement object is located on part of the optical path.

25. The apparatus according to claim 24, that further includes optical reflection means disposed at the measurement object.

26. The apparatus according to claim 25, wherein said light modulation means includes at least one pair of optical modulators having mutually opposed forward modulation directions.

27. The apparatus according to claim 24, wherein said light modulation means includes at least one pair of optical modulators having mutually opposed forward modulation directions.

28. The apparatus according to claim 17, wherein part of an optical path comprises optical reflection means.

29. The apparatus according to claim 28, wherein said light modulation means includes at least one pair of optical modulators having mutually opposed forward modulation directions.

30. The apparatus according to claim 17, further comprising an optical path, a half-wave plate provided on the optical path, and a 90-degree Faraday rotator provided on the optical path configured to adjust a rotation of the half-wave plate, whereby an intensity of the light output from the second terminal of the optical distributor is increased when the light is not modulated compared to when the light is modulated, or is decreased when the light is not modulated compared to when the light is modulated.

31. The apparatus according to claim 30, wherein said light modulation means includes at least one pair of optical modulators having mutually opposed forward modulation directions.

32. The apparatus according to claim 17, wherein said light modulation means includes at least one pair of optical modulators having mutually opposed forward modulation directions.

33. A method of measurement of optical dispersion, comprising:
using light generation means to generate a light beam;
inputting the generated light beam to a first terminal of an optical distributor;
outputting the input light beam as a plurality of light beams;
modulating at least two of the plurality of light beams;
returning the at least two light beams to the optical distributor;
outputting the returned light beams from a second terminal of the optical distributor;
detecting a time-averaged intensity of the light beams output from said second terminal; and
obtaining a dependency between the detected time-averaged intensity and an optical modulation frequency applied during said modulating.

34. A method of measurement of optical dispersion, comprising:
using light generation means to generate a light beam;
inputting the generated light beam to a first terminal of an optical distributor;
outputting the input light beam from third and fourth terminals of the optical distributor;
guiding the light beams output from the third and fourth terminals to a single optical path so that the beams travel along the optical path in mutually opposite directions;
modulating light traveling along the optical path from the third terminal to the fourth terminal and modulating light traveling along the optical path from the fourth terminal to the third terminal;

outputting to a second terminal of the optical distributor the modulated light traveling from the third terminal to the fourth terminal and the modulated light traveling from the fourth terminal to the third terminal;

detecting a time-averaged intensity of the light output from the second terminal;

obtaining a dependency between the detected time-averaged intensity and an optical modulation frequency applied during said modulating;

finding a periodicity in a relationship between the optical modulation frequency and said detected time-averaged intensity of the light output from the second terminal; and obtaining a wavelength dispersion characteristic of the optical path from a dependency of the periodicity on a wavelength of the light input to the first terminal.

35. A method of measurement of optical dispersion, comprising:

using light generation means to generate a light beam;

inputting the generated light beam to a first terminal of an optical distributor;

outputting the input light beam from third and fourth terminals of the optical distributor;

guiding the light beams output from the third and fourth terminals to a substantially single optical path so that the beams travel along the optical path in mutually opposite directions;

modulating light traveling along the optical path from the third terminal to the fourth terminal and modulating light traveling along the optical path from the fourth terminal to the third terminal, using a modulation signal having a periodic frequency that is not less than a periodicity found in an optical intensity relationship of light output from a second terminal of the optical distributor;

outputting from the second terminal of the optical distributor the modulated light traveling from the third terminal to the fourth terminal and the modulated light traveling from the fourth terminal to the third terminal;

detecting a time-averaged intensity of the light output from the second terminal;

finding a periodicity in a relationship between an optical modulation frequency and the detected time-averaged intensity of the light output from the second terminal; and using the periodicity to obtain a length of the optical path and changes in the length.

36. An optical dispersion measurement apparatus comprising:

first means for generating monochromatic light;

second means for extracting two parts from said monochromatic light;

third means for directing the two parts of light onto a common optical path, incorporating an optical modulator and a device under test and traversing said optical modulator and said device on said common optical path in opposite directions;

fourth means for combining the two parts of light using said second means to obtain a combined light;

fifth means for detecting a time-averaged intensity of the combined light;

sixth means for obtaining a dependency between said detected time-averaged intensity of the combined light and a modulation frequency of said optical modulator; and seventh means for acquiring from the dependency an optical path length of said device or a variation of the optical path length.

37. An optical dispersion measurement apparatus comprising:

first means for generating monochromatic light;

second means for extracting two parts from said monochromatic light;

third means for directing the two parts of light onto a common optical path, incorporating an optical modulator and a device under test and traversing said optical modulator and said device on said common optical path in opposite directions;

fourth means for combining the two parts of light using said second means to obtain a combined light;

fifth means for detecting a time-averaged intensity of the combined light;

sixth means for obtaining a dependency between said detected time-averaged intensity of the combined light and a modulation frequency of said optical modulator to obtain a relationship; and seventh means for acquiring from a variation of the dependency according to a variation of a wavelength of the generated monochromatic light a wavelength dispersion characteristic of said device.

38. An optical dispersion measurement apparatus comprising:

means for generating a light beam;

means for inputting the generated light beam to a first terminal of an optical distributor;

means for outputting the input light beam as a plurality of light beams;

optical modulation means for modulating at least two of the plurality of light beams;

an optical path via which the at least two modulated light beams are returned to the optical distributor;

means for outputting the light beams returned to the optical distributor from a second terminal of the optical distributor;

means for detecting light output from the second terminal; and means for relating an intensity of the detected light to an optical modulation frequency, wherein part of the optical path comprises optical reflection means.

39. An optical dispersion measurement apparatus comprising:

means for generating a light beam;

means for inputting the generated light beam to a first terminal of an optical distributor;

means for outputting the input light from a third terminal and a fourth terminal of the optical distributor;

light modulation means for modulating light traveling from the third terminal to the fourth terminal and light traveling from the fourth terminal to the third terminal;

means for outputting from a second terminal of the optical distributor modulated light traveling from the third terminal to the fourth terminal and from the fourth terminal to the third terminal;

means for detecting the light output from the second terminal; and means for relating an intensity of the detected light to an optical modulation frequency, wherein part of an optical path comprises optical reflection means.

40. An optical dispersion measurement apparatus comprising:

means for generating a light beam;

means for inputting the generated light beam to a first terminal of an optical distributor;

means for outputting the input light beam as a plurality of light beams;

optical modulation means for modulating at least two of the plurality of light beams;

an optical path via which the at least two modulated light beams are returned to the optical distributor;

means for outputting the light beams returned to the optical distributor from a second terminal of the optical distributor;

means for detecting light output from the second terminal; and means for relating an intensity of the detected light to an optical modulation frequency, wherein said optical modulation means includes at least one pair of optical modulators having mutually opposed forward modulation directions.

41. An optical dispersion measurement apparatus comprising:

means for generating a light beam;

means for inputting the generated light beam to a first terminal of an optical distributor;

means for outputting the input light from a third terminal and a fourth terminal of the optical distributor;

light modulation means for modulating light traveling from the third terminal to the fourth terminal and light traveling from the fourth terminal to the third terminal;

means for outputting from a second terminal of the optical distributor modulated light traveling from the third terminal to the fourth terminal and from the fourth terminal to the third terminal;

means for detecting the light output from the second terminal; and means for relating an intensity of the detected light to an optical modulation frequency, wherein said light modulation means includes at least one pair of optical modulators having mutually opposed forward modulation directions.

42. An optical dispersion measurement apparatus comprising:

a light source configured to generate a light beam;

an optical distributor configured to distribute light into a plurality of light beams;

a first optical fiber configured to input the generated light beam to a first terminal of the optical distributor;

a modulation device configured to modulate at least two of the plurality of light beams;

an optical path via which the at least two modulated light beams are returned to the optical distributor and the at least two modulated light beams propagate in opposite directions along said optical path;

a second optical fiber configured to output the at least two modulated light beams returned to the optical distributor from a second terminal of the optical distributor;

a detector configured to detect a time-averaged intensity of light output from the second terminal; and a calculator device configured to obtain a dependency between the detected time-averaged intensity and an optical modulation frequency applied by said optical modulation device.

43. An optical dispersion measurement apparatus comprising:

a light source configured to generate a light beam;

an optical distributor configured to distribute light into a plurality of light beams to a third terminal and a fourth terminal of the optical distributor;

a first optical fiber configured to input the generated light beam to a first terminal of the optical distributor;

a light modulation device configured to modulate light traveling from the third terminal to the fourth terminal and light traveling from the fourth terminal to the third terminal of the optical distributor;

a second optical fiber configured to output from a second terminal of the optical distributor modulated light traveling from the third terminal to the fourth terminal and from the fourth terminal to the third terminal of the optical distributor;

a detector configured to detect a time-averaged intensity of the light output from the second terminal; and a calculator device configured to obtain a dependency between the detected time-averaged intensity and an optical modulation frequency applied by said light modulation device.

44. An optical dispersion measurement apparatus comprising:

a light source configured to generate monochromatic light;

an optical distributor configured to extract two parts from said monochromatic light, to direct the two parts of light onto a common optical path incorporating an optical modulator and a device under test and traversing said optical modulator and said device on said common optical path in opposite directions, and to combine the two parts of light to obtain a combined light;

a detector configured to detect a time-averaged intensity of the combined light;

a calculator device configured to obtain a dependency between said detected time-averaged intensity of the combined light and a modulation frequency of said optical modulator and to acquire from a variation of the dependency according to a variation of a wavelength of the generated monochromatic light a wavelength dispersion characteristic of said device under test.

* * * * *